United States Patent
Kusunoki et al.

(10) Patent No.: US 12,494,338 B2
(45) Date of Patent: Dec. 9, 2025

(54) ELECTRON SOURCE, ELECTRON BEAM DEVICE, AND METHOD FOR MANUFACTURING ELECTRON SOURCE

(71) Applicant: Hitachi High-Tech Corporation, Tokyo (JP)

(72) Inventors: Toshiaki Kusunoki, Tokyo (JP); Tomihiro Hashizume, Tokyo (JP); Noriaki Arai, Tokyo (JP); Keigo Kasuya, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 518 days.

(21) Appl. No.: 17/781,267

(22) PCT Filed: Dec. 24, 2019

(86) PCT No.: PCT/JP2019/050481
§ 371 (c)(1),
(2) Date: May 31, 2022

(87) PCT Pub. No.: WO2021/130837
PCT Pub. Date: Jul. 1, 2021

(65) Prior Publication Data
US 2022/0415603 A1    Dec. 29, 2022

(51) Int. Cl.
*H01J 37/06*    (2006.01)
*G01N 23/2251*    (2018.01)
(Continued)

(52) U.S. Cl.
CPC ........ *H01J 37/075* (2013.01); *G01N 23/2251* (2013.01); *H01J 9/18* (2013.01);
(Continued)

(58) Field of Classification Search
None
See application file for complete search history.

(56) References Cited

U.S. PATENT DOCUMENTS

| | | |
|---|---|---|
| 2002/0020822 A1 | 2/2002 | Okunuki |
| 2010/0019648 A1 | 1/2010 | Yasuda et al. |
| | (Continued) | |

FOREIGN PATENT DOCUMENTS

| | | |
|---|---|---|
| JP | 61-47038 A | 3/1986 |
| JP | 2000-173900 A | 6/2000 |
| | (Continued) | |

OTHER PUBLICATIONS

Japanese-language Office Action issued in Japanese Application No. 2021-566413 dated Apr. 11, 2023 with English translation (nine (9) pages).
(Continued)

*Primary Examiner* — Eliza W Osenbaugh-Stewart
(74) *Attorney, Agent, or Firm* — Crowell & Moring LLP

(57) ABSTRACT

In a Schottky emitter or a thermal field emitter using a hexaboride single crystal, side emission from portions other than an electron emission portion is reduced. An electron source according to the invention includes: a protrusion (40) configured to emit an electron when an electric field is generated; a shank (41) that supports the protrusion (40) and has a diameter decreasing toward the protrusion (40); and a body (42) that supports the shank (41), in which the protrusion (40), the shank (41), and the body (42) are each made of a hexaboride single crystal, and a part including the shank (41) and the body (42) excluding the protrusion (40) is covered with a material having a work function higher than that of the hexaboride single crystal.

8 Claims, 21 Drawing Sheets

(51) Int. Cl.
  *H01J 9/18* (2006.01)
  *H01J 37/075* (2006.01)
(52) U.S. Cl.
  CPC ..... *G01N 2223/07* (2013.01); *G01N 2223/20* (2013.01); *G01N 2223/418* (2013.01); *H01J 2237/06316* (2013.01)

(56) References Cited

U.S. PATENT DOCUMENTS

| | | | |
|---|---|---|---|
| 2014/0097736 A1* | 4/2014 | Katsap | H01J 1/148 445/51 |
| 2015/0002009 A1 | 1/2015 | Zhang et al. | |
| 2018/0005791 A1 | 1/2018 | Schultz et al. | |
| 2019/0221399 A1* | 7/2019 | Morishita | H01J 9/04 |
| 2019/0237289 A1 | 8/2019 | Kasuya et al. | |

FOREIGN PATENT DOCUMENTS

| | | |
|---|---|---|
| JP | 2009-152645 A | 7/2009 |
| JP | 2019-525401 A | 9/2019 |
| WO | WO 2008/120412 A1 | 10/2008 |
| WO | WO 2014/007121 A1 | 1/2014 |
| WO | WO 2018/070010 A1 | 4/2018 |

OTHER PUBLICATIONS

International Search Report (PCT/ISA/210) issued in PCT Application No. PCT/JP2019/050481 dated Mar. 17, 2020 with English translation (five (5) pages).
Japanese-language Written Opinion (PCT/ISA/237) issued in PCT Application No. PCT/JP2019/050481 dated Mar. 17, 2020 (five (5) pages).

* cited by examiner

[FIG. 2]
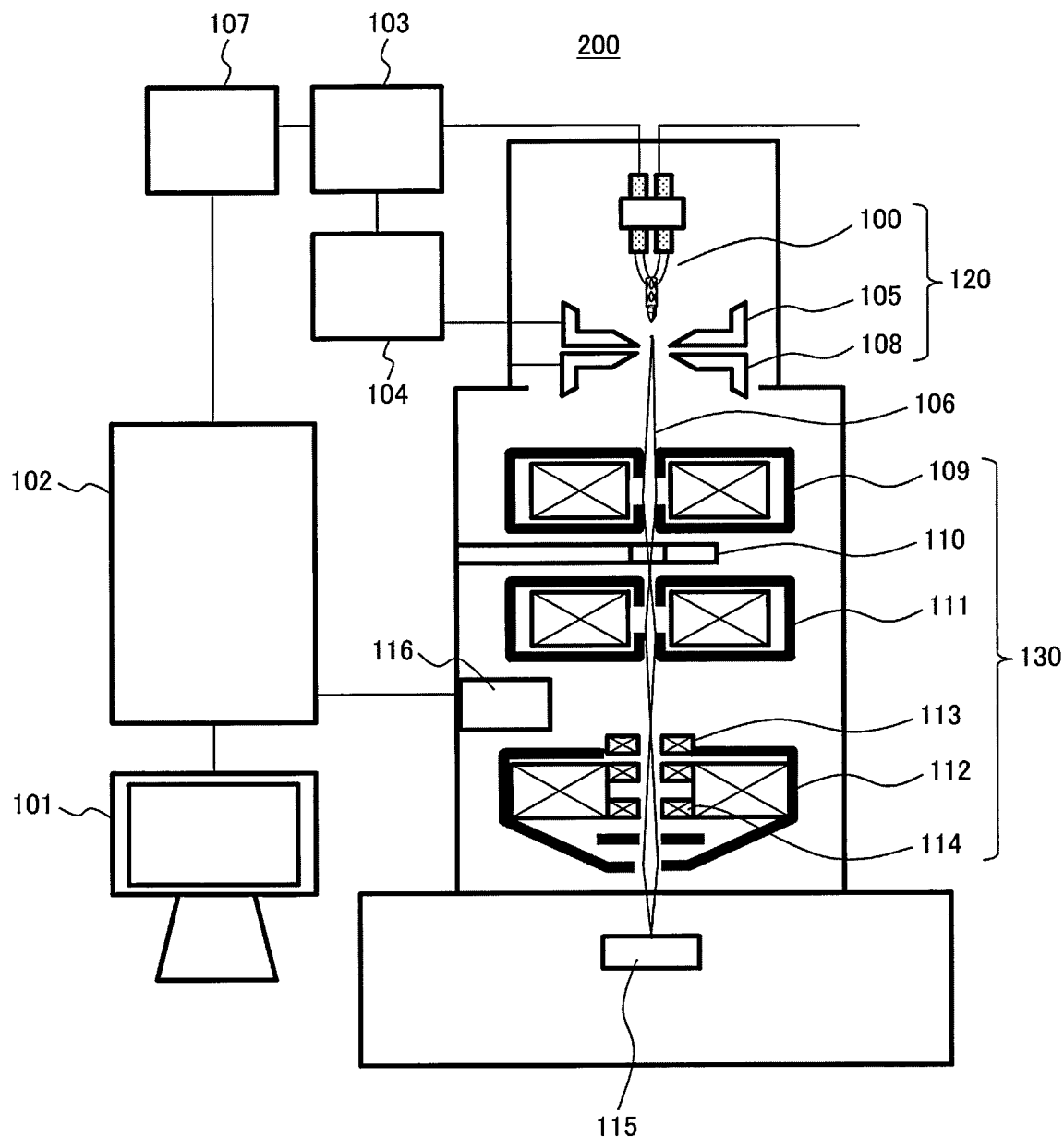

[FIG. 3]
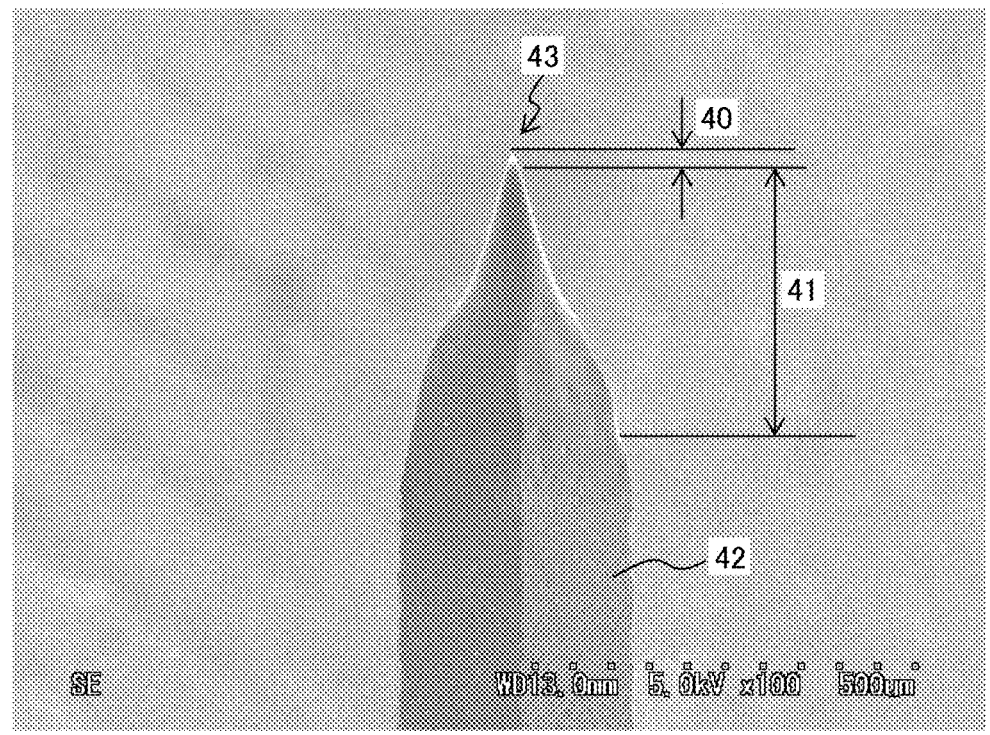
[FIG. 4]
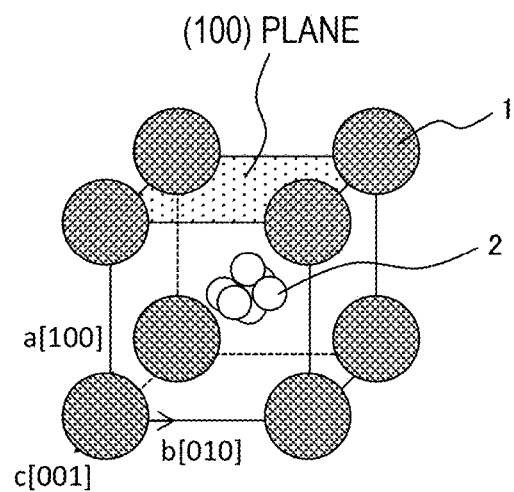

[FIG. 5]
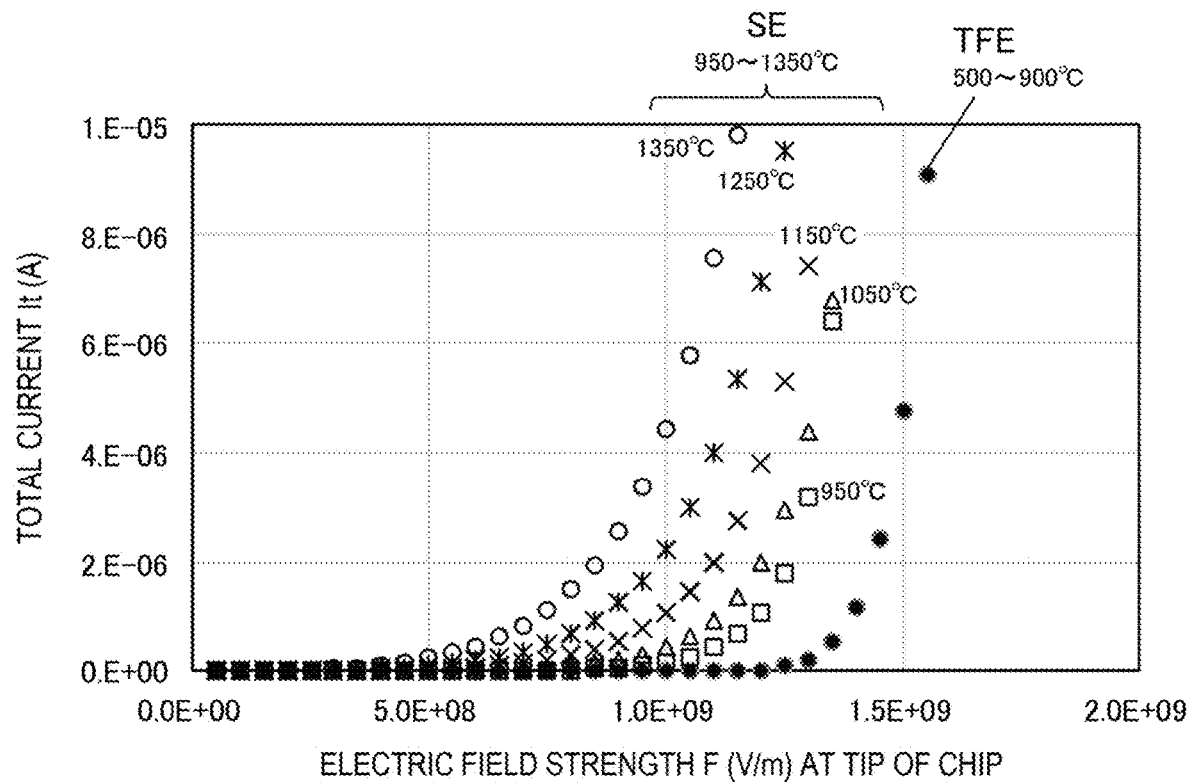
[FIG. 6]
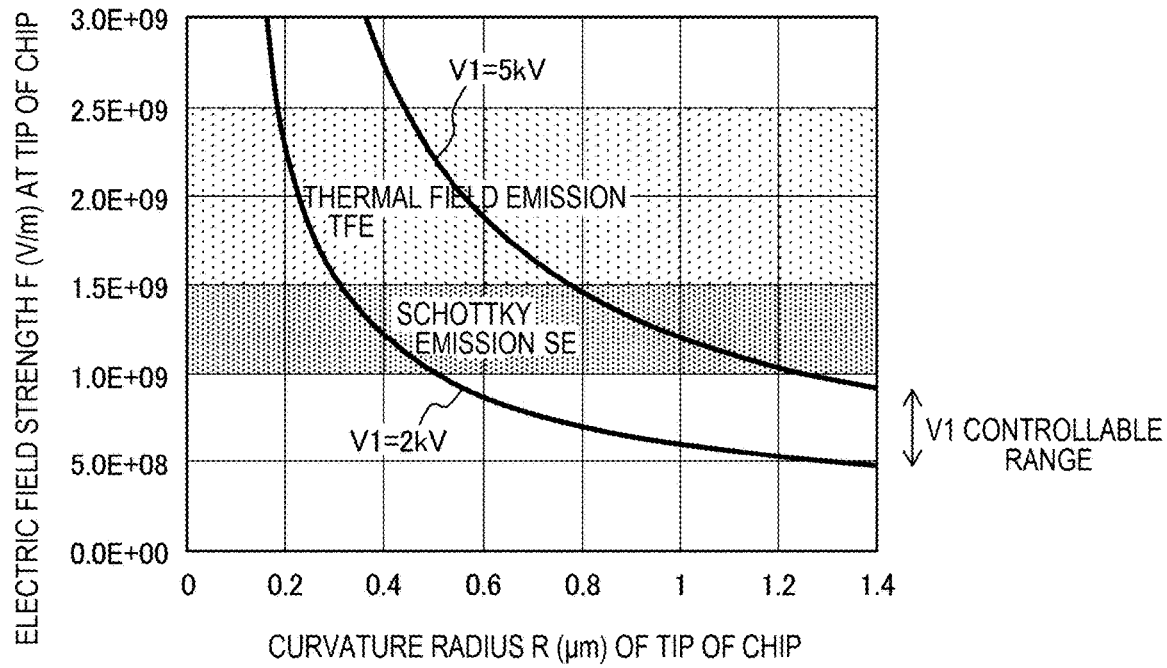

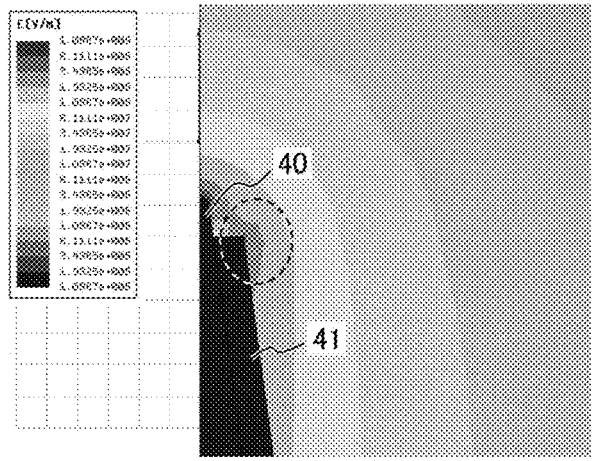
FIG. 7A L=1μm
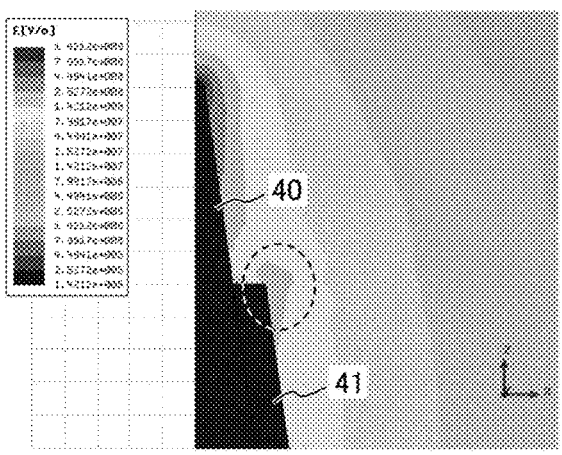
FIG. 7B L=5μm
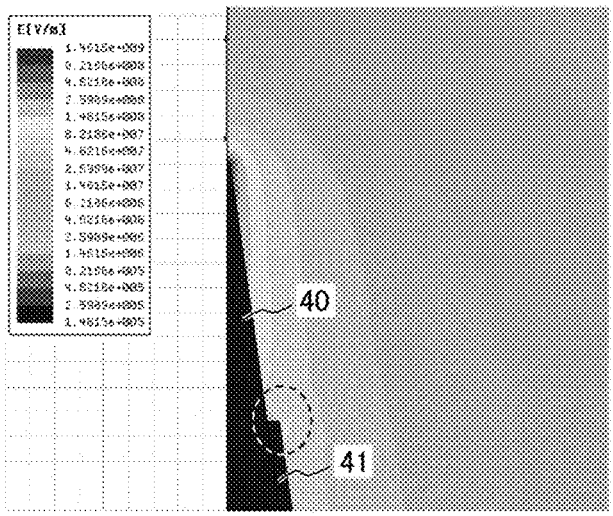
FIG. 7C L=20μm
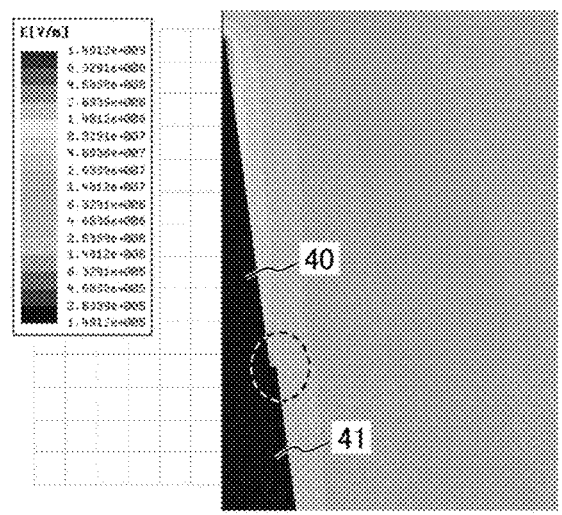
FIG. 7D L=50μm

[FIG. 8]
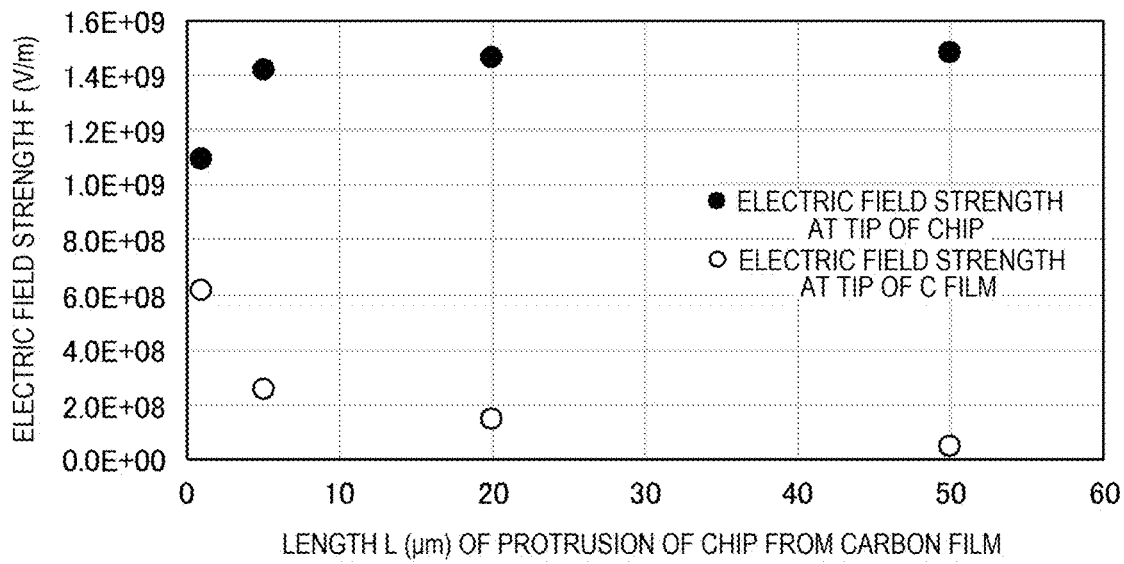
[FIG. 9]
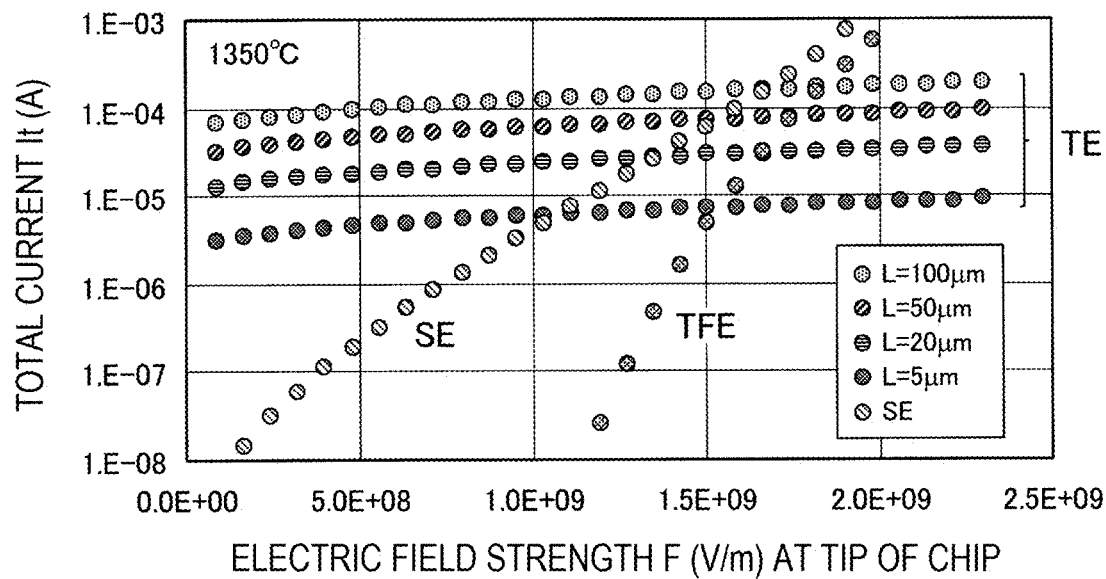

[FIG. 10]
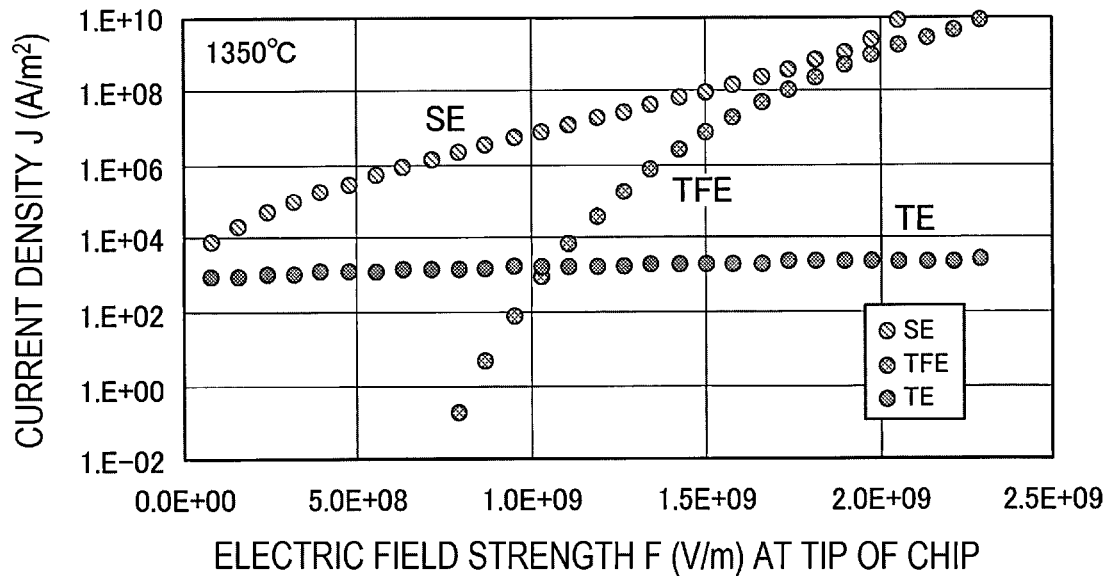
[FIG. 11]
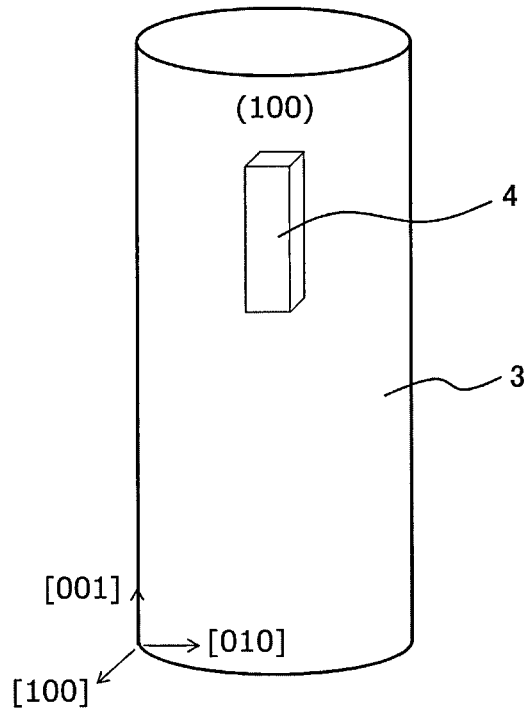

[FIG. 12]
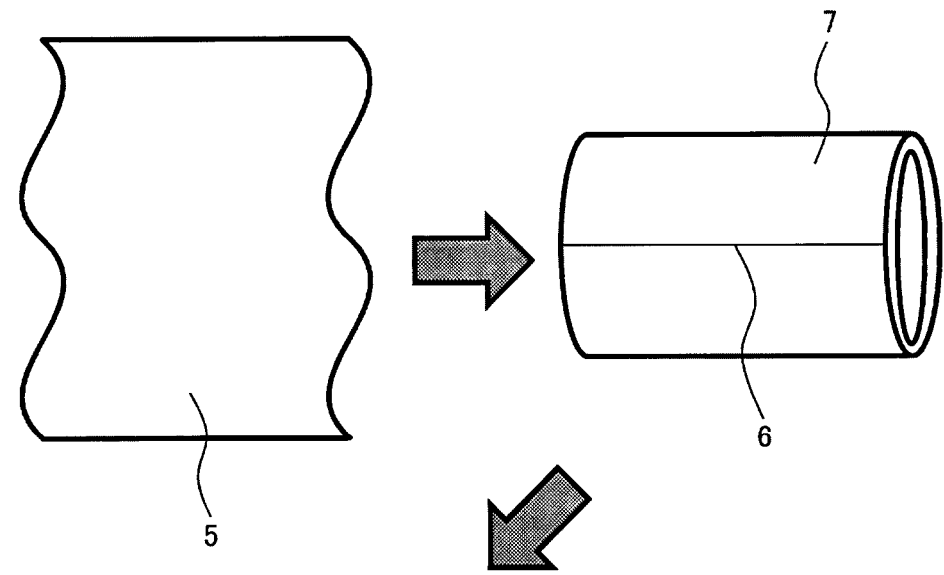
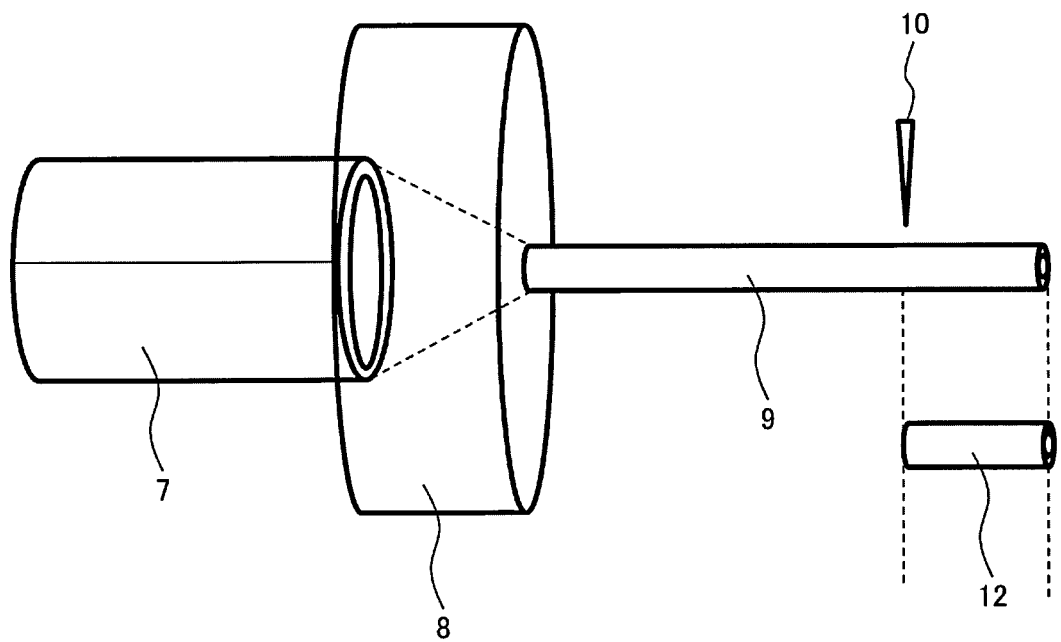

[FIG. 13]
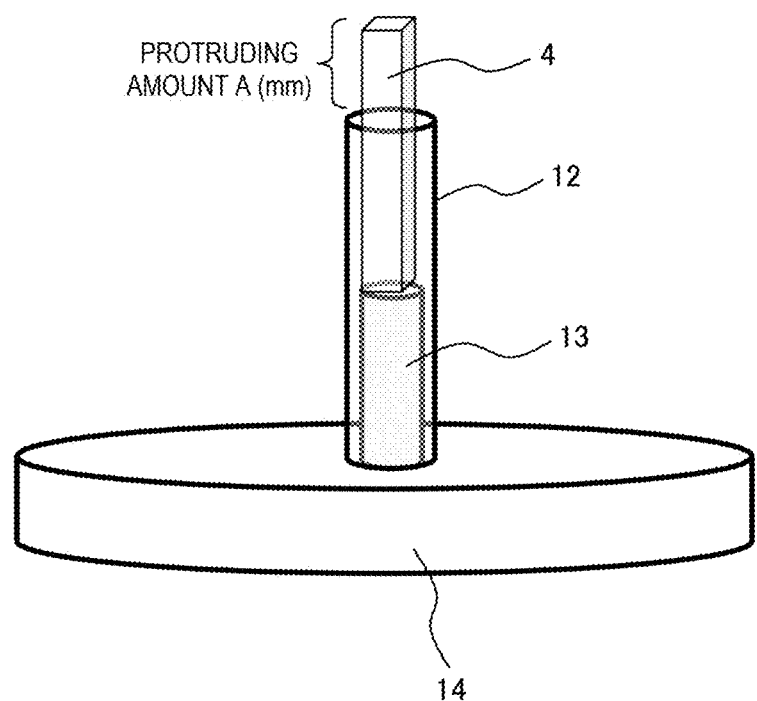

[FIG. 14]
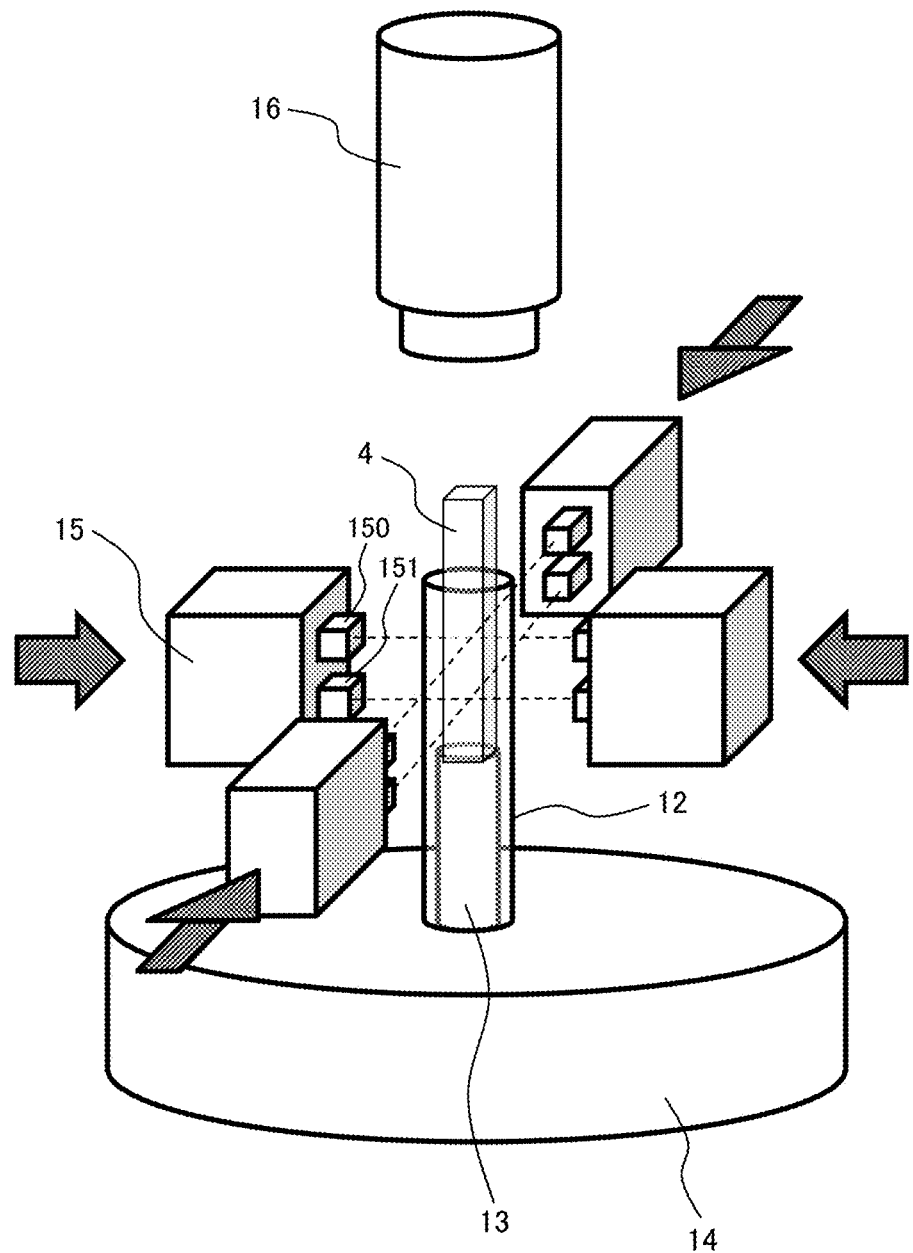

[FIG. 15]
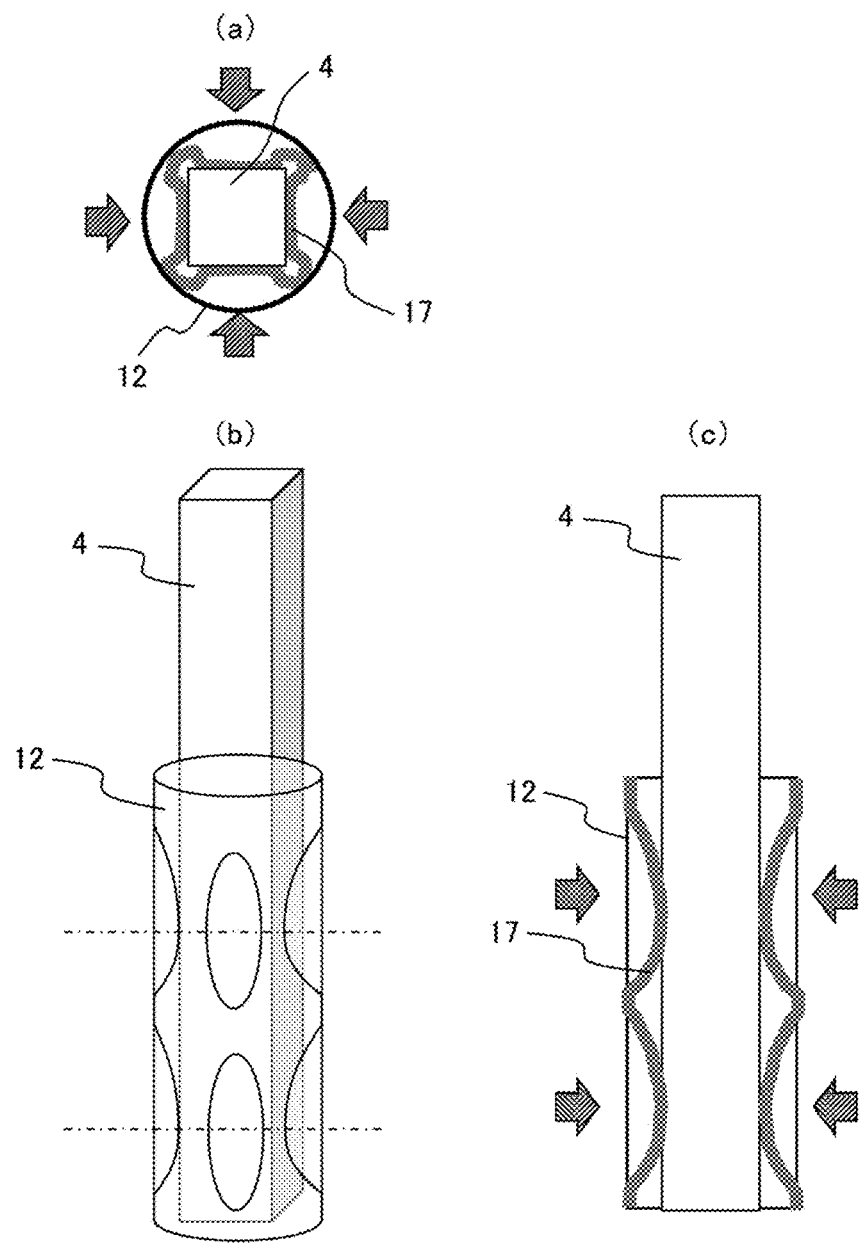

[FIG. 16]
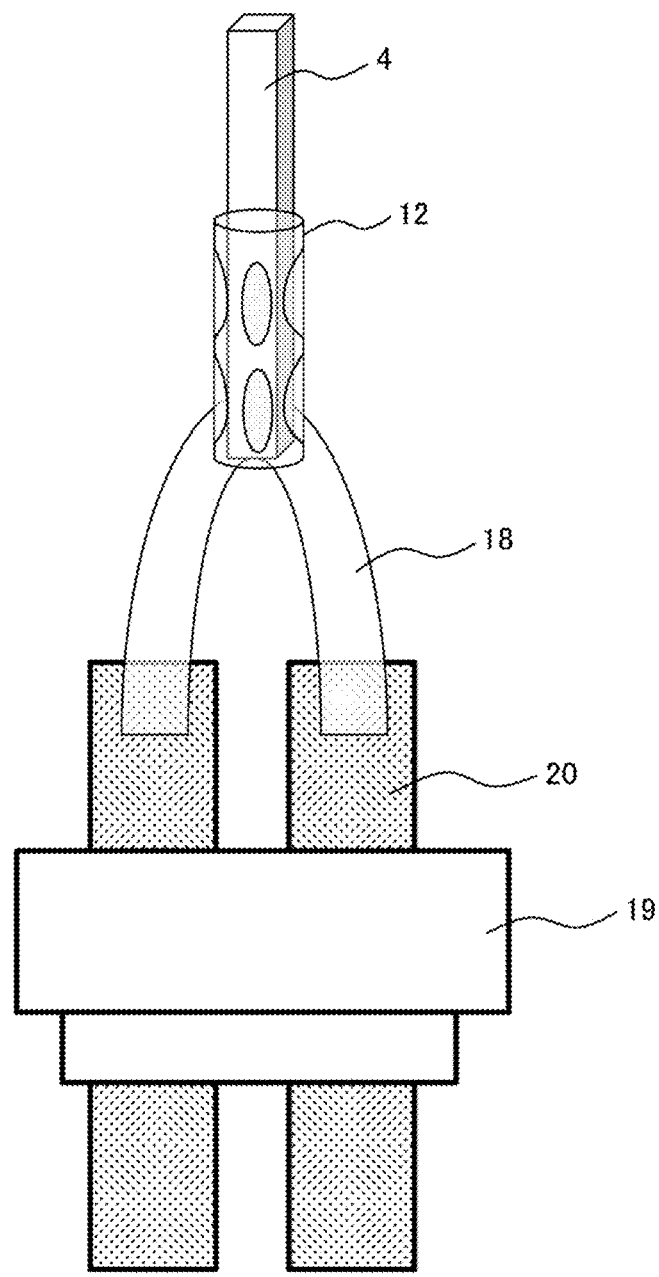

[FIG. 17]
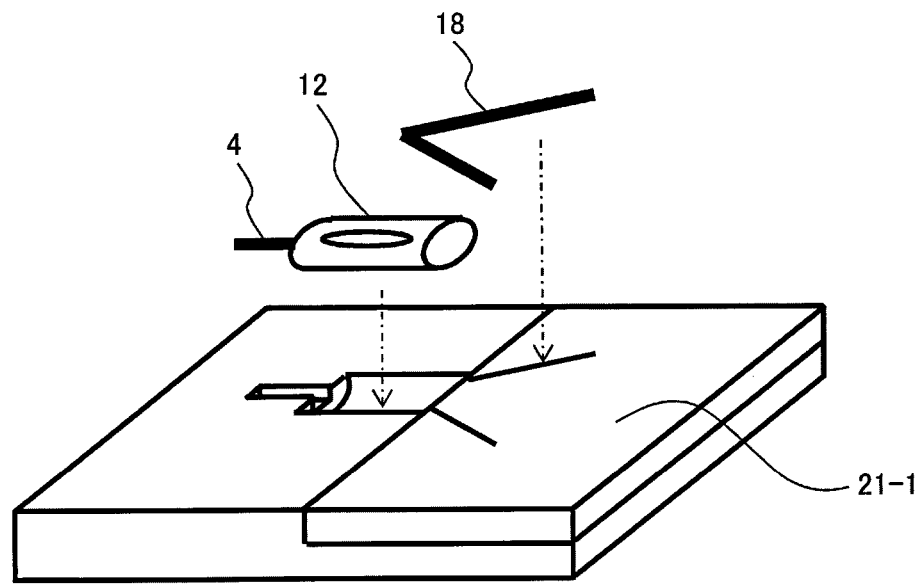
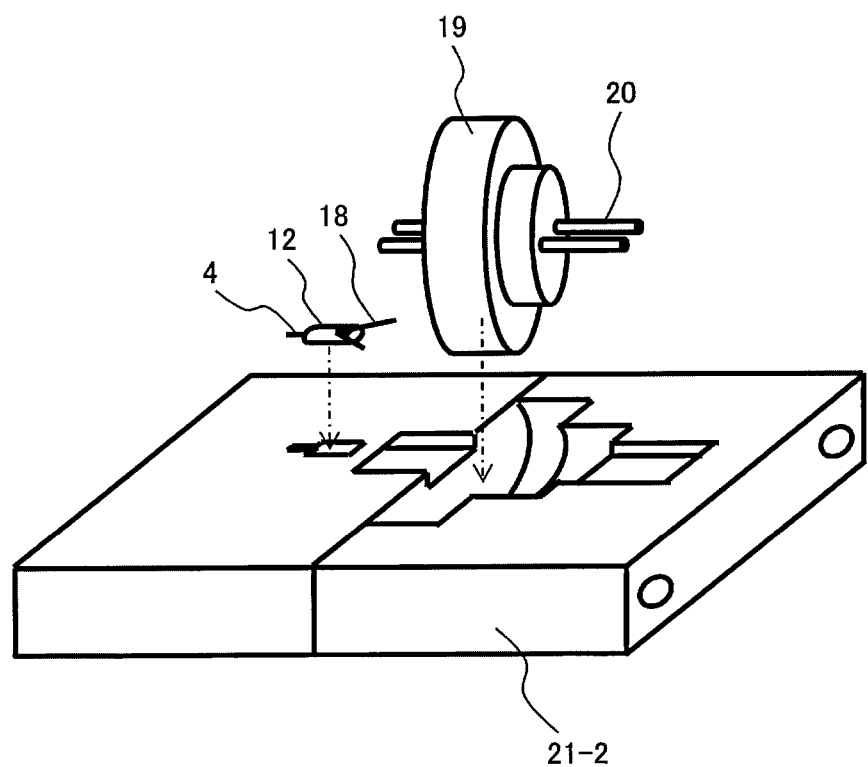

[FIG. 18]
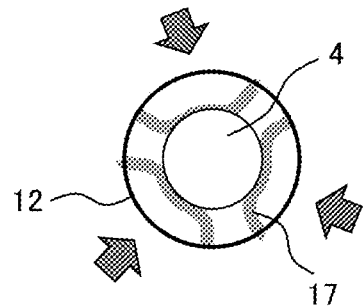
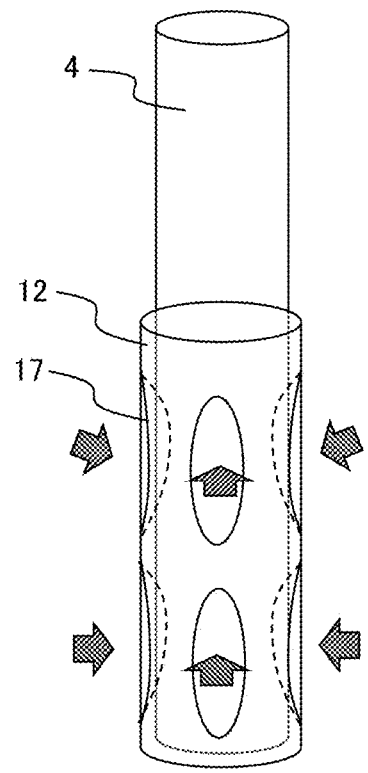
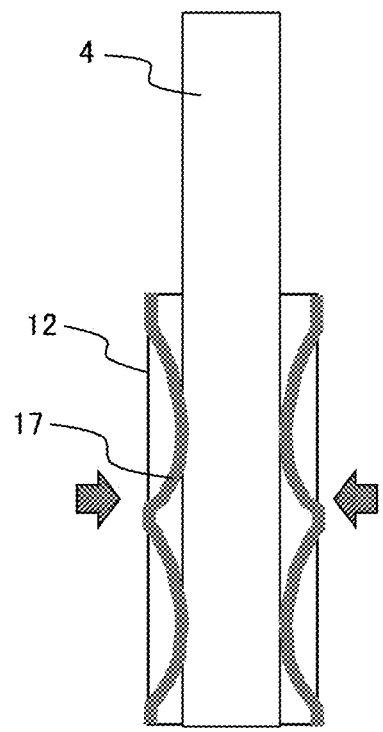

[FIG. 19]
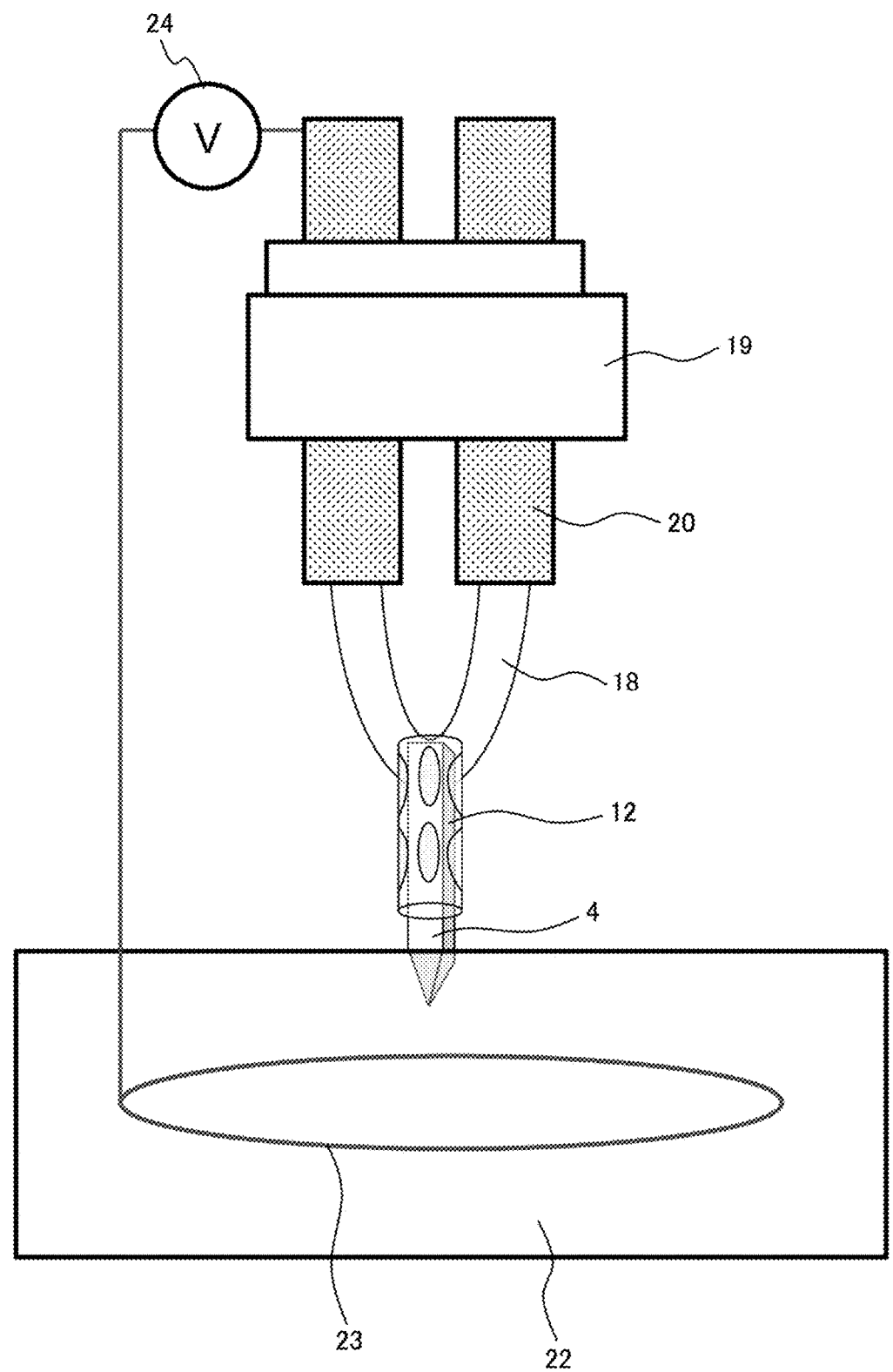

[FIG. 20]
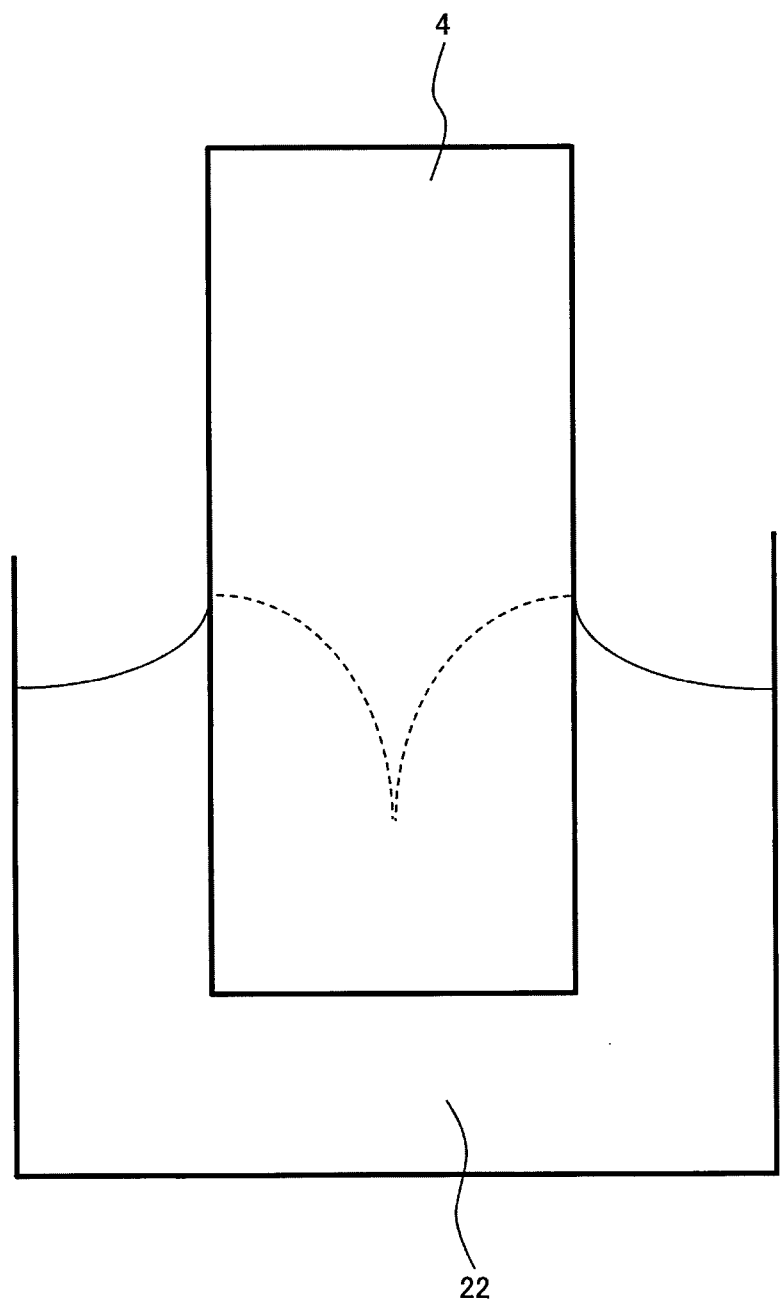

[FIG. 21]
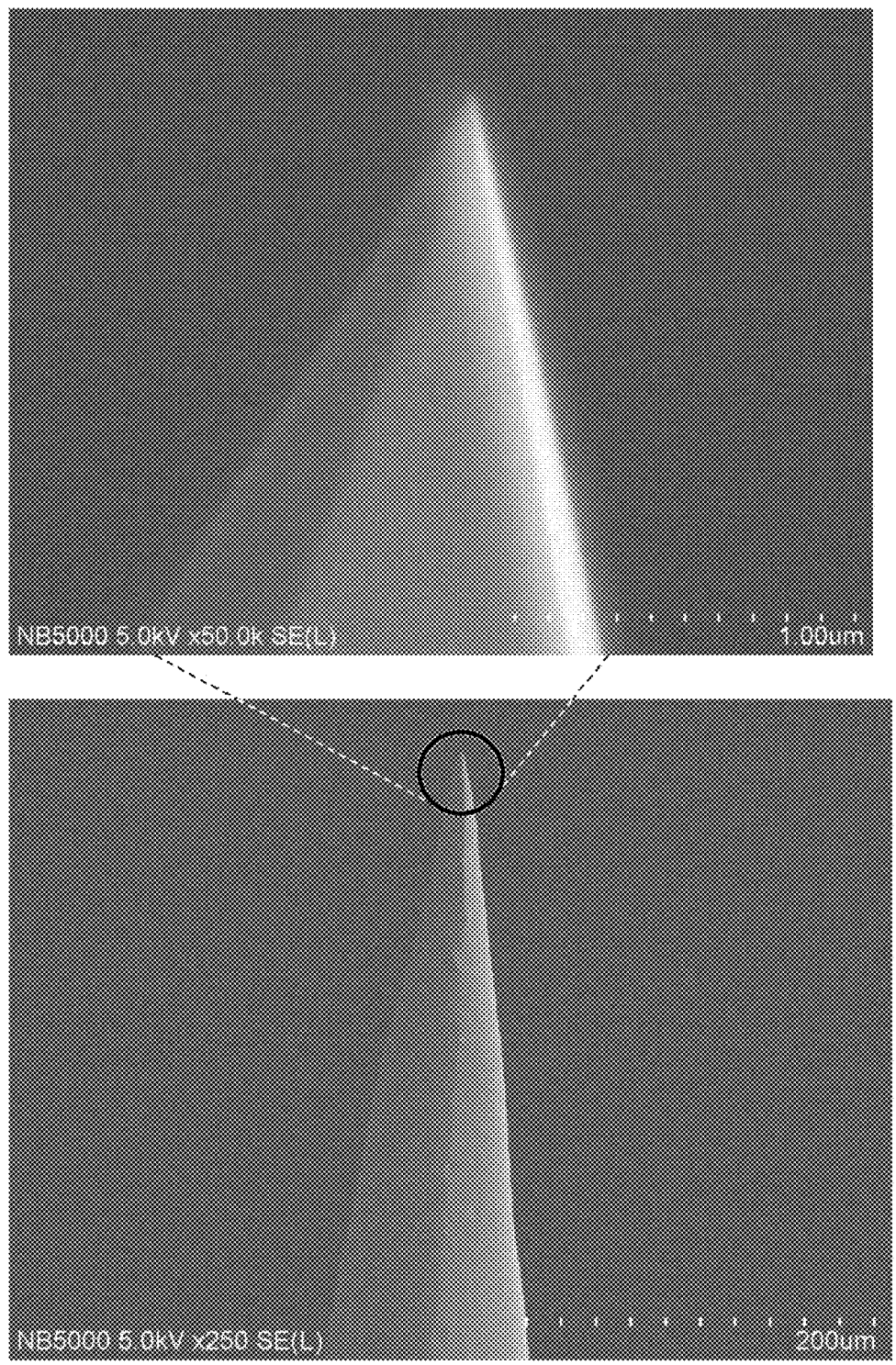

[FIG. 22]
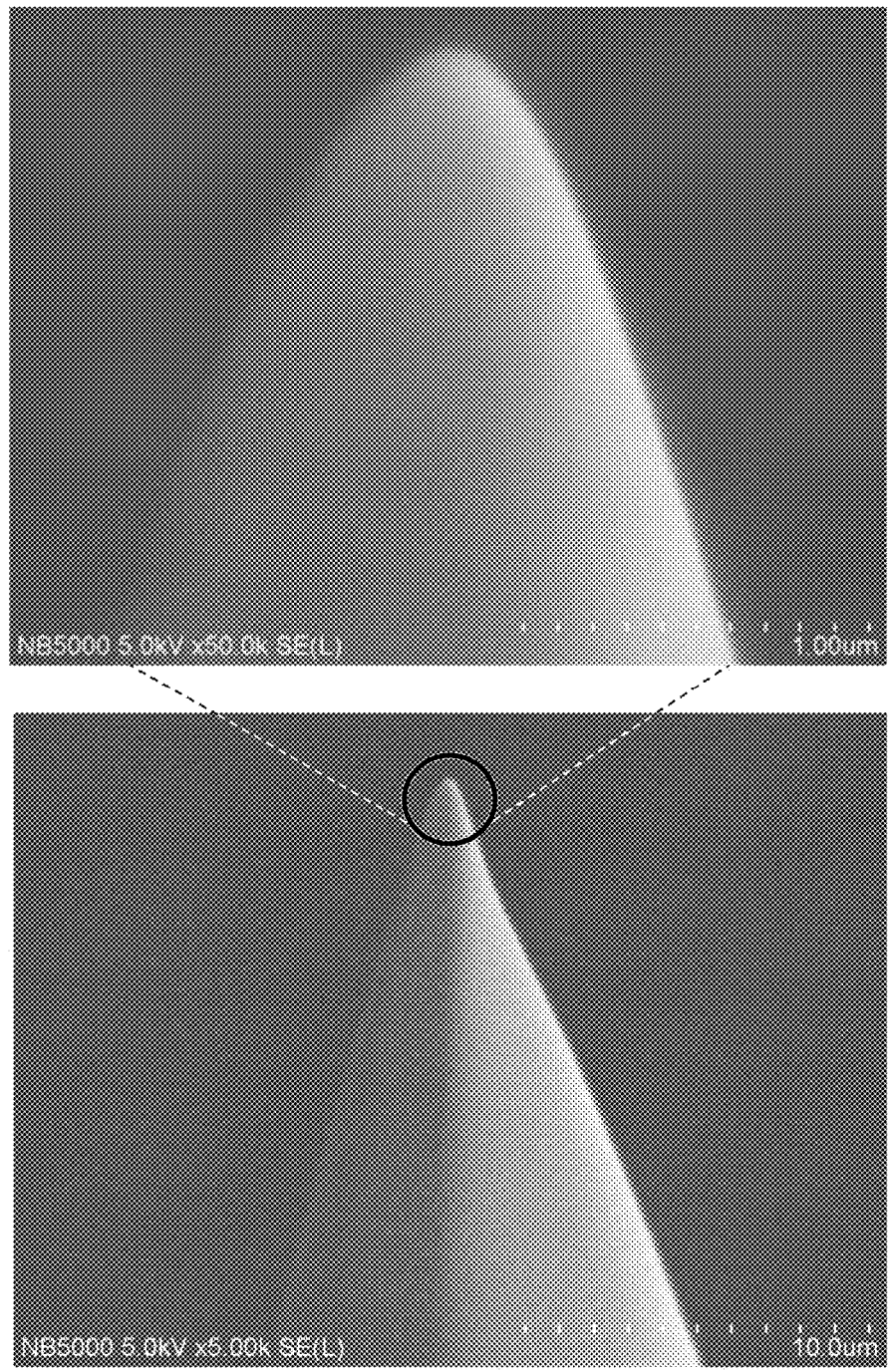

[FIG. 23]
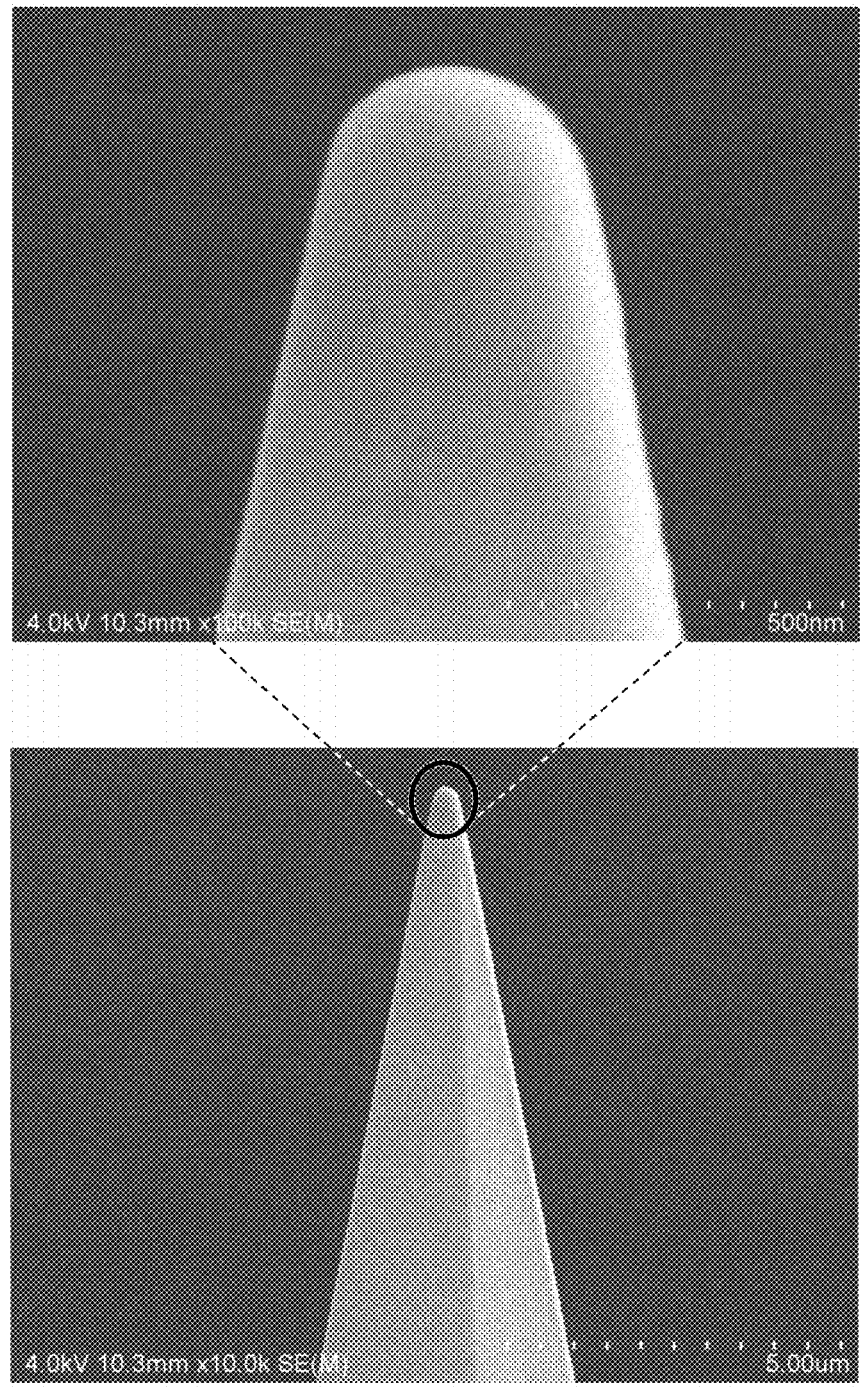

FIG. 24A
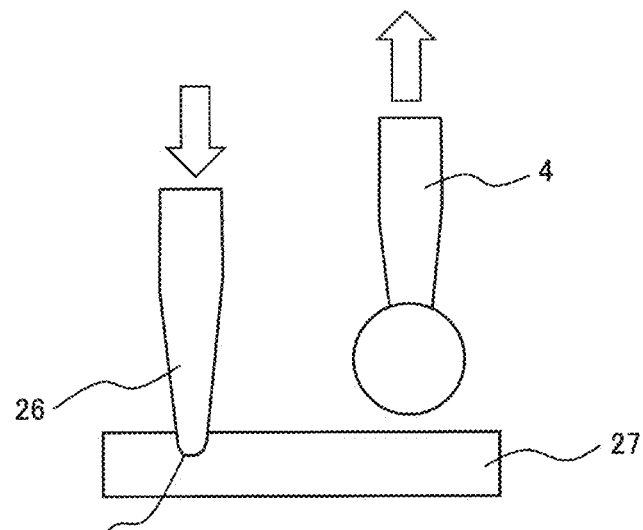
FIG. 24B
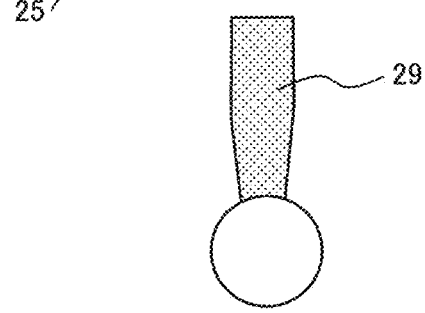
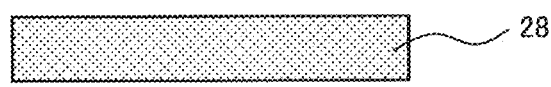
FIG. 24C
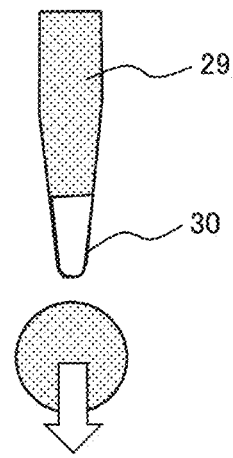

[FIG. 25]
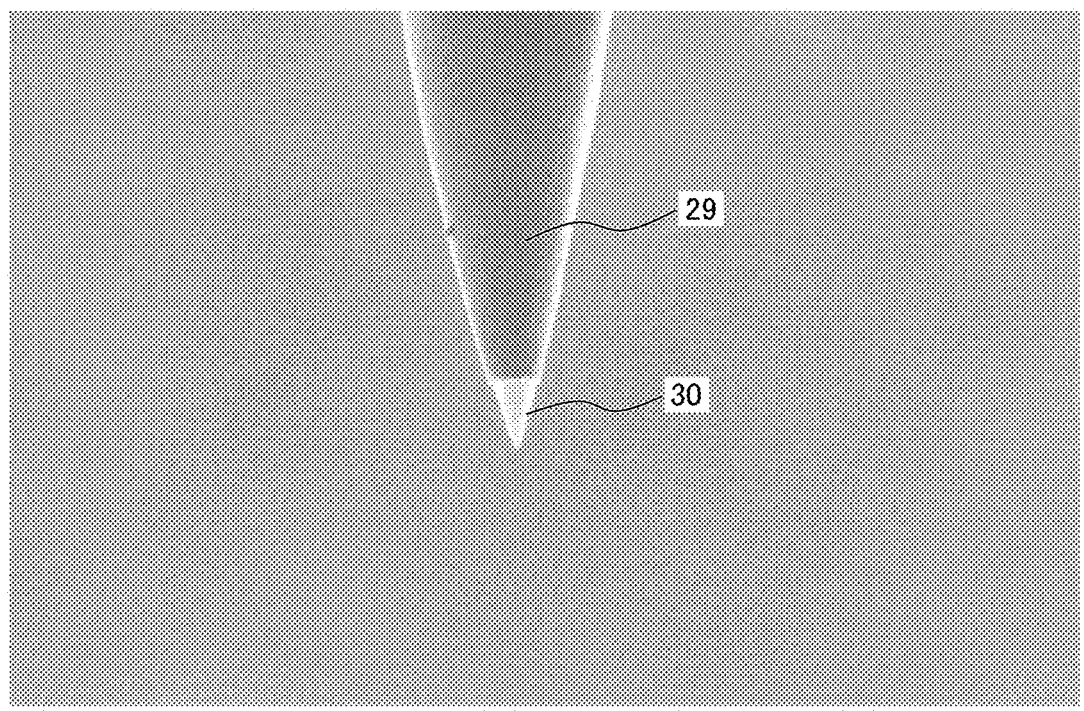

ELECTRON SOURCE, ELECTRON BEAM DEVICE, AND METHOD FOR MANUFACTURING ELECTRON SOURCE

TECHNICAL FIELD

The present invention relates to an electron source, an electron beam device, and a method for manufacturing an electron source.

BACKGROUND ART

An electron microscope has a spatial resolution that exceeds an optical limit, and can observe a microstructure in the order of nm to pm and analyze a composition. Therefore, the electron microscope is widely used in engineering fields such as materialogy, physics, medicine, biology, electricity, and machinery. Among electron microscopes, a scanning electron microscope (SEM) serves as a device that can easily observe a surface of a sample.

Electron sources used in an electron beam device such as an electron microscope include a thermal emitter (TE), a field emitter (FT), and a Schottky emitter (SE). FIG. 1 is an energy diagram showing operation principles of the thermal emitter, the field emitter, and the Schottky emitter. The thermal emitter (TE) shown in (a) of FIG. 1 extracts an electron e in a vacuum by heating a filament made of tungsten (W) processed into a hairpin shape to about 2500° C. and causing the electron thermally excited in a W solid to cross an energy barrier of a work function $\Phi$ (4.3 eV) of W. Since the electron source is constantly heated, surface contamination of the electron source due to gas adsorption or the like does not occur, and a stable electron beam with few current variations can be extracted. On the other hand, since the electron source is heated to a very high temperature, an energy full width at half maximum $\Delta E_{TE}$ of the emitted electrons is as large as 3 eV to 4 eV. Since the electrons are emitted from all the heated portions, an electron emission area is large. Since a light source size is large, luminance B (emitted current amount per unit area and per unit solid angle) is as low as about $10^5$ A/cm²sr. Therefore, a thermal emitter made of a hexaboride such as $LaB_6$ which has a work function $\Phi$ of 2.6 eV, which is smaller than that of W, is also used. Since the $LaB_6$ thermal emitter has a smaller work function $\Phi$, an operation temperature can be reduced to about 1400° C. to 1600° C., the energy full width at half maximum $\Delta E_{TE}$ can be reduced to 2 eV to 3 eV, and the luminance B can be increased to about $10^6$ A/cm²sr.

As described above, the thermal emitter has a large energy full width at half maximum $\Delta E_{TE}$ and a large chromatic aberration of an electron optical system such as an objective lens, and thus has a low spatial resolution. However, the thermal emitter is used in an electron source of a simple scanning electron microscope (SEM) that is easy to handle and inexpensive, or a transmission electron microscope (TEM) that has a high acceleration voltage and is less influenced by the chromatic aberration.

The field emitter (FE) shown in (b) of FIG. 1 can emit an electron beam with good monochromaticity and high luminance, so that the chromatic aberration of the electron optical system can be reduced and the field emitter is used as an electron source for a scanning electron microscope having a high spatial resolution. In general, the field emitter is used as a cold field emitter (CFE) at room temperature, but is also used as a thermal field emitter (TFE) used by heating to about several 100° C. in order to prevent gas adsorption or the like. A tungsten (W) tip having a sharp apex is widely used as the cold field emitter (CFE). When an external electric field F is concentrated at the tip of the W tip, the energy barrier is effectively thinned, whereby the electron e in the W tip is transmitted through the energy barrier by a quantum-mechanical tunneling phenomenon and emitted to a vacuum. Since the cold field emitter (CFE) can be operated at room temperature, the energy full width at half maximum $\Delta E_{FE}$ of the extracted electron e is as small as about 0.3 eV. Since the electrons are emitted from a small electron emission area at the very sharp apex of the tip, the light source size is small, and the luminance is as high as $10^8$ A/cm²sr. In order to further reduce the energy full width at half maximum $\Delta E_{FE}$ and increase the luminance B in the field emitter, a cold field emitter using a nanowire of a hexaboride such as $LaB_6$ having a small work function $\Phi$ is also proposed (for example, PTL 1). Since a barrier of the work function is lower than that of W and a tunnel probability in a vicinity of a Fermi surface can be increased at a lower electric field, the energy full width at half maximum $\Delta E_{FE}$ can be further reduced.

On the other hand, in a length-measuring scanning electron microscope for performing dimension measurement of a semiconductor device or the like, a ZrO/W Schottky emitter (SE) in which zirconium oxide ($ZrO_2$) is applied to a W tip and thermally diffused to a W (100) crystal plane is used. The ZrO/W Schottky emitter is constantly heated to about 1400° C. to 1500° C., ZrO thermally diffused to a tip of the W tip reduces the work function $\Phi$ of the (100) plane of the W tip to about 2.8 eV, and thermal electrons cross an energy barrier whose work function $\Phi$ is reduced by a Schottky effect caused by the external electric field F applied to the apex of the tip and an image potential, and are emitted. Although the Schottky emitter can stably extract a current density larger than that of the field emitter, an energy full width at half maximum $\Delta E_{SE}$ is as large as about 0.6 eV to 1 eV since the operation temperature is high.

The inventors have developed and disclosed a cold field emitter (CFE) which emits an electric field at room temperature, in which a hexaboride single crystal such as $CeB_6$ prepared by a floating zone method or the like so far is used, a tip thereof is processed to have a curvature radius of about 50 nm to 150 nm or about 300 nm to 500 nm by using electropolishing, focused ion beam processing (FIB), electric field evaporation, or the like, and a heat treatment such as flushing or annealing is performed in a vacuum at 1000° C. to 1400° C. for about 5 seconds to 10 minutes to form a (310) crystal plane of $CeB_6$ having a low work function (PTL 2). The field emitter has monochromaticity better than that of the field emitter in the W tip in the related art, and the energy full width at half maximum $\Delta E_{FE}$ at the same radiation angle current density is as smaller as 0.08 eV to 0.14 eV as compared with that of W. When a ratio J$\Omega$/It of a radiation angle current density J$\Omega$ (μA/sr) to a total current It is 6 times or more, the radiation angle current density is high, the curvature radius of the apex of the tip is small, so that a field emitter having a small light source size and high luminance can be implemented. According to this invention, particularly, the chromatic aberration of the scanning electron microscope at a low acceleration voltage can be improved, and observation of a polar surface of a sample or observation of a light element substance such as a carbon-based compound can be performed with a high spatial resolution.

CITATION LIST

Patent Literature

PTL 1: WO 2014/007121
PTL 2: WO 2018/070010

SUMMARY OF INVENTION

Technical Problem

The field emitter using a hexaboride single crystal such as $CeB_6$ is suitable for a scanning electron microscope having a high spatial resolution since the field emitter has high luminance, good monochromaticity of emitted electrons, and a reduced chromatic aberration of an electron optical system such as an objective lens. However, there is a problem that the field emitter has a work function lower than that of the field emitter such as W, and is thus relatively sensitive to a change in work function due to gas adsorption, and is inferior in stability of an emission current.

Therefore, it is considered to use a thermal field emitter (TFE) that prevents gas adsorption obtained by heating the field emitter using a hexaboride single crystal such as $CeB_6$ as, or a Schottky emitter (SE) obtained by further heating the above field emitter to a high temperature. Since the hexaboride single crystal such as $CeB_6$ has a low work function not only at the apex of the tip but also in the entire tip, there is a problem that unnecessary electron emission (side emission) occurs frequently from a side wall of the heated tip. The unnecessary side emission increases the total current It per radiation angle current density $J\Omega$, and thus a large current capacity is required due to a high-voltage power supply applied to an extraction electrode, which leads to an increase in device cost. In addition, since electron shock desorption gas generated at the extraction electrode increases, a degree of vacuum decreases and a gas adsorption amount on the tip increases, which hinders current stabilization of an electron source, and in some cases, causes defects such as discharge destruction of the tip. Further, electrons having irregular energy and emission directions are emitted from the apex of the tip and mixed with a main beam to cause noise and flare in an image of the electron microscope, which is not preferable because the image quality deteriorates.

In order to reduce the side emission, similar to the ZrO/W Schottky emitter, a method of reducing the unnecessary side emission by using a suppressor electrode that applies a negative electric field to the side wall of the tip is considered. However, there is a problem that an electrode structure of the electron source is complicated and a new power supply for a suppressor is required, resulting in a high cost.

In view of the above circumstances, the invention provides an electron source, an electron beam device, and a method for manufacturing an electron source that prevent an occurrence of side emission in a field emitter or a Schottky emitter using a hexaboride single crystal.

Solution to Problem

In order to achieve the above object, an electron source according to an aspect of the invention includes: a protrusion configured to emit an electron when an electric field is generated; a shank that supports the protrusion and has a diameter decreasing toward the protrusion; and a body that supports the shank. The protrusion, the shank, and the body are each made of a hexaboride single crystal, and a part including the shank and the body excluding the protrusion is covered with a material having a work function higher than that of the hexaboride single crystal.

In order to achieve the above object, an electron beam device according to another aspect of the invention includes: an electron source; a sample stage on which a sample is to be placed; electron gun optical system provided with an acceleration electrode and an extraction electrode that extracts an electron from the electron source; and an electron optical system configured to focus the emitted electron on the sample on the sample stage and irradiate the sample with the emitted electron. The electron source is the electron source according to the invention described above.

In order to achieve the above object, a method for manufacturing an electron source according to still another aspect of the invention is provided, the electron source including: a protrusion configured to emit an electron when an electric field is generated; a shank that supports the protrusion and has a diameter decreasing toward the protrusion; and a body that supports the shank. The method includes: a step of preparing a tip substrate in which the protrusion, the shank, and the body portion are each made of a hexaboride single crystal; a step of forming a mask on the protrusion of a tip; a step of forming on the tip a material having a work function larger than that of the hexaboride single crystal; and a step of removing the mask to expose the protrusion.

Advantageous Effect

According to the invention, it is possible to provide an electron source, an electron beam device, and a method for manufacturing an electron source that prevent an occurrence of side emission in a field emitter or a Schottky emitter using a hexaboride single crystal.

BRIEF DESCRIPTION OF DRAWINGS

FIG. 1 is an energy diagram

FIG. 2 is a schematic diagram showing an example of an electron beam device according to the invention.

FIG. 3 is an enlarged SEM observation photograph of a tip portion of an electron source in FIG. 2.

FIG. 4 is a schematic diagram showing a unit cell of $CeB_6$.

FIG. 5 is a graph showing a relation between an electric field strength F (V/m) at a tip of a chip of a $CeB_6$ single crystal and a total current It (A) in electron emission.

FIG. 6 is a graph showing a relation between a curvature radius R (μm) of the tip of the chip of the $CeB_6$ single crystal and the electric field strength F (V/m) of at the tip of the chip.

FIGS. 7A to 7D are graphs showing an electric field strength distribution near the tip of chip when a length L of a protrusion is (a) 1 μm, (b) 5 μm, (c) 20 μm, and (d) 50 μm.

FIG. 8 is a graph showing a relation between the length L of the protrusion at the tip of the chip and the electric field strength F (V/m).

FIG. 9 shows electric field strength dependencies of an emission current of a thermal electron emission component (TE), a Schottky emission component (SE), and a thermal field emission component (TFE) when chips having lengths L of protrusions of 5 μm, 20 μm, 50 μm, and 100 μm operate at 1350° C.

FIG. 10 shows electric field strength dependencies of an emission current density of the thermal electron emission component (TE), the Schottky emission component (SE), and the thermal field emission component (TFE) when the chips having lengths L of protrusions of 5 µm, 20 µm, 50 µm, and 100 µm operate at 1350° C.

FIG. 11 is a schematic diagram showing a hexaboride single crystal.

FIG. 12 is a schematic diagram showing a method for manufacturing a chip made of a hexaboride single crystal.

FIG. 13 is a schematic diagram showing a method for manufacturing a chip made of a hexaboride single crystal.

FIG. 14 is a schematic diagram showing a method for manufacturing a chip made of a hexaboride single crystal.

FIG. 15 is a schematic diagram of a joined body of a hexaboride chip 4 and a metal tube 12.

FIG. 16 is a schematic diagram showing a method for manufacturing a chip made of a hexaboride single crystal.

FIG. 17 is a schematic diagram showing a method for manufacturing a chip made of a hexaboride single crystal.

FIG. 18 is a schematic diagram showing a method for manufacturing a chip made of a hexaboride single crystal.

FIG. 19 is a schematic diagram showing a method for manufacturing a chip made of a hexaboride single crystal.

FIG. 20 is a schematic diagram showing a method for manufacturing a chip made of a hexaboride single crystal.

FIG. 21 is a SEM observation photograph of a tip of the chip made of a hexaboride single crystal.

FIG. 22 is a SEM observation photograph of the tip of the chip made of a hexaboride single crystal.

FIG. 23 is a SEM observation photograph of the tip of the chip made of a hexaboride single crystal.

FIGS. 24A to 24C are schematic diagrams showing a method of forming a coating film on the tip of the chip made of a hexaboride single crystal.

FIG. 25 is a SEM observation photograph of the tip of the chip made of a hexaboride single crystal.

DESCRIPTION OF EMBODIMENTS

Figure 1A:
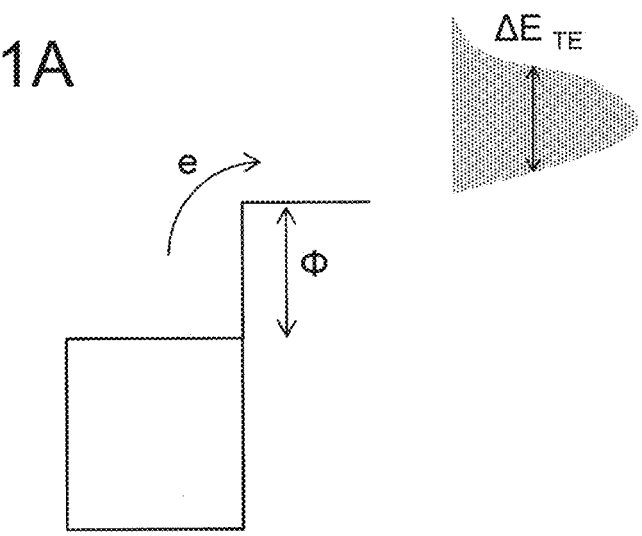
FIGS. 1A to 1C are energy diagrams showing operation principles of a thermal emitter, a field emitter, and a Schottky emitter.
Figure 1B:
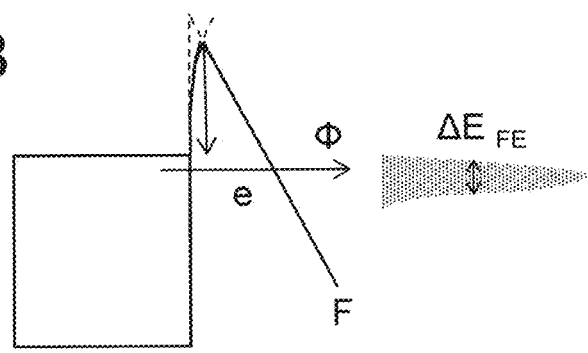
Figure 1C:
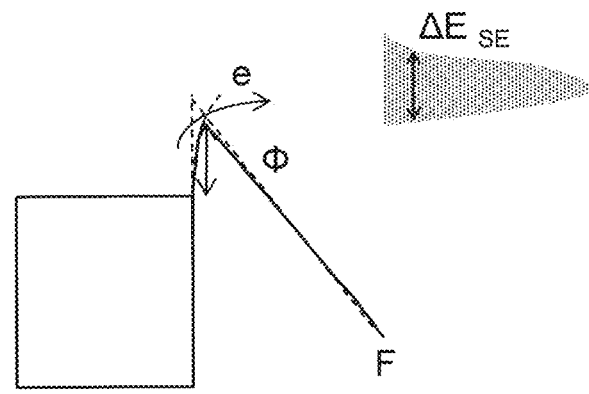

As a result of intensive studies, the present inventor has found that by coating a part of a tip made of a hexaboride single crystal such as $CeB_6$, which has been developed for a cold field emitter (CFE), excluding an electron emission portion, with a material having a work function higher than that of the hexaboride single crystal, and applying a strong electric field while heating to emit electrons by Schottky emission or thermal field emission, electron emission with high luminance, high current stability and good monochromaticity can be obtained. It has been known that, by applying this electron source to an electron beam device, it is possible to implement an electron beam device such as a scanning electron microscope that can perform surface observation with a high spatial resolution. The invention is based on this finding.

Hereinafter, the invention will be described according to embodiments with reference to the drawings. A scanning electron microscope (SEM) is described as an example in an embodiment of the electron beam device, but the invention is not limited thereto, and can be applied to an electron beam device such as a transmission electron (TEM), microscope a scanning transmission electron microscope (STEM), an electron beam exposure device, and an electron beam 3D printer. In the following drawings, a scale of each configuration is appropriately changed in order to make a configuration of the invention easy to understand. Crystal planes will be represented according to Miller indices, a plane will be represented by ( ) and a crystal axis will be represented by [ ].

[Electron Source and Electron Beam Device]

FIG. 2 is a schematic diagram showing an example of an electron beam device according to the invention, and FIG. 3 is an enlarged SEM observation photograph of a tip portion of an electron source in FIG. 2. As shown in FIG. 2, an electron beam device 200 according to the present embodiment broadly includes an electron source (electron gun) 120 that emits electrons and generates an electron beam 106, and an electron optical system 130 that focuses the electron beam 106 generated from the electron source 120 on a sample 115 and irradiates the sample 115 with the electron beam 106.

The electron source 120 includes an electron source (emitter) 100 that emits electrons, an extraction electrode 105, and an acceleration electrode 108. The electron source 100 is controlled to be constantly heated by flowing a constant current from a heating power supply 103 controlled by a computer 101 and a controller 102. The extraction electrode 105 applies a positive voltage to an apex of a tip (not shown) of the electron source 100 with an extraction power supply 104, and electrons are emitted by a Schottky effect or a thermal field emission effect. The emitted electron beam 106 is accelerated toward the grounded acceleration electrode (anode) 108 by a high negative voltage applied by an acceleration power supply 107 that applies an electric potential to the tip.

The electron optical system 130 includes a first condenser lens 109, an aperture 110, a second condenser lens 111, an objective lens 112, an astigmatism correction coil 113, and a deflection scanning coil 114. The electron beam 106 accelerated by the acceleration electrode 108 is focused by the first condenser lens 109, the aperture 110, the second condenser lens 111, the objective lens 112, and the astigmatism correction coil 113, is scanned by the deflection scanning coil 114, and irradiates an observation region on the sample 115. The generated secondary electrons are detected by a secondary electron detector 116.

The detector may be placed between the objective lens and the sample in addition to a position shown in FIG. 2, and can be switched and used depending on an operating condition of the device. Although a detector other than the secondary electron detector is not shown, a reflected electron detector, an elemental analyzer, or the like is also used.

As shown in FIG. 3, the electron source 100 includes a tip 43 made of a hexaboride single crystal. An apex of the tip 43 includes a protrusion 40 (electron emission portion) that emits electrons, a shank 41 that supports the protrusion 40 and has a diameter decreasing toward the protrusion, and a body 42 that supports the shank 41. A portion of the tip 43 excluding the protrusion 40, i.e., a part including the shank 41 and the body 42 is covered with a material having a work function higher than that of the hexaboride single crystal. As a hexaboride, for example, $CeB_6$ is preferred. Carbon is preferred as a material having a work function higher than that of the hexaboride single crystal. Since the portion of the tip 43 excluding the protrusion 40, i.e., the part including the shank and the body 42 is covered with the material having a work function higher than that of the hexaboride single crystal, side emission can be prevented and electron emission with high luminance, high current stability, and good monochromaticity can be obtained.

Since the electrons emitted from a $CeB_6$ Schottky emitter or a $CeB_6$ thermal field emitter 100 have a small energy full width at half maximum and good monochromaticity, a chromatic aberration at the objective lens 112 or the like can be reduced, the sample 115 can be irradiated with the more focused electron beam 106, and a scanning electron microscope image having a high resolution can be obtained. In addition, since a radiation angle current density is high, an imaging time can be shortened, and an analysis time in an elemental analysis or the like can also be shortened. Further, since the emitted current has high long-term stability, the electron source can also be used in an electron microscope used in, for example, a mass production factory such as length measurement of a semiconductor device in a semiconductor factory.

FIG. 4 is a schematic diagram showing a unit cell of $CeB_6$. As shown in FIG. 4, $CeB_6$ has a crystal structure in which six blocks of boron atoms 2 are located in a body center of a simple cubic lattice of Ce atoms 1. $CeB_6$ has a work function of about 2.6 eV, which is much lower than that of W, about 4.3 eV, and in Ce, f electrons having high energy localization and high state density are present immediately below a Fermi level, and electrons passing through a work function barrier by field emission or electrons excited by heating have a high density. Therefore, Ce is suitable as a material for preparing a field emitter or a Schottky emitter having a high current density. As the hexaboride, $LaB_6$ or the like is preferred in addition to $CeB_6$.

Next, a preferred value of a curvature radius R of the apex of the tip for operating as the thermal field emitter or the Schottky emitter with high luminance using the hexaboride single crystal such as $CeB_6$, and a preferred value of a length L of the protrusion constituting the apex of the tip and a part of the shank not coated with a carbon film will be described. FIG. 5 is a graph showing a relation between an electric field strength F (V/m) at the apex of the tip made of a hexaboride single crystal using $CeB_6$ and a total current It (μA) in electron emission. As shown in FIG. 5, when a heating temperature of the tip is a relatively low temperature of 500° C. to 900° C., the tip serves as a thermal field emitter, and an electric field strength of $1.5 \times 10^9$ V/m or more is necessary to obtain a current (about 10 μA in total current) necessary for the electron microscope. When the heating temperature is raised to 950° C. to 1350° C., Schottky emitted electrons are mainly used, and in this case, an electric field strength of $1.0 \times 10^9$ V/m or more is also necessary. In order to obtain such a strong electric field strength, it is necessary to reduce the curvature radius of the apex of the tip made of a hexaboride single crystal and to concentrate the electric field.

FIG. 6 is a graph showing a relation between the curvature radius R (μm) of the apex of the tip using the $CeB_6$ single crystal and the electric field strength F (V/m) of at the apex of the tip. FIG. 6 shows the relation as a function of an extraction voltage V1 of the electron microscope. In consideration of a cost and controllability of a high voltage power supply and a risk of tip damage due to discharge, the extraction voltage V1 of the electron microscope is usually about V1=2 kV to 5 kV. In order to apply, to the apex of the tip, an electric field strength of $1 \times 10^9$ V/m necessary for Schottky emission within the control range of V1, it is necessary to set the curvature radius of the apex of the tip to at least 1.2 μm or less, and in order to be able to control the entire control range of V1, it is necessary to set the curvature radius to 0.8 μm or less. In order to obtain an electric field strength of $1.5 \times 10^9$ V/m necessary for thermal field emission, it is necessary to set the curvature radius to at least 0.8 μm or less, and in order to be able to control the entire control range of V1, it is necessary to set the curvature radius to 0.5 μm or less. When the electric field is too strong for the Schottky emitter, thermal field emission electrons are mixed, which is not preferable. Therefore, a lower limit of the curvature radius of the apex of the tip is set to 0.3 μm, and more preferably 0.4 μm. When a diameter of the tip is too small for the thermal field emitter, a voltage cannot be controlled within the voltage controllable range of V1, and thus the lower limit of the curvature radius is 0.2 μm, and more preferably 0.3 μm.

Next, a required length of the length L of the protrusion 40 not coated with the carbon film will be described. When the tip made of the hexaboride single crystal such as $CeB_6$ having a low work function is heated and used, thermal electron emission occurs from the entire heated tip. Although a current density of the thermal electron emission is low, since the area of the entire tip is large, the total current is larger than the current obtained by the thermal field emission or the Schottky emission, and a large amount of unnecessary current becomes a problem. Therefore, it is necessary to coat the carbon film having a work function higher than that of the hexaboride single crystal such as $CeB_6$ to prevent the thermal electron emission. The carbon film may also be used to cover a thermal emitter, and a thickness of the carbon film is usually required to be 1 μm or more in order to sufficiently prevent the thermal electron emission. However, when the carbon film is covered on the thermal field emitter or the Schottky emitter with a high luminance as in the invention, it is necessary to set the curvature radius of the apex of the tip as small as about 0.2 μm to 1.2 μm as described above. When the carbon film having a thickness of 1 μm or more is formed on a side wall of the tip, a shape of the apex of the tip is largely changed, and there is a problem that an electric field is hardly concentrated on the apex of the tip. There is also a problem that a strong electric field is applied to an end face or the like of the carbon film, unnecessary field emission or the like is likely to occur, and the operation of the electron source is unstable.

Therefore, according to the invention, the relation between the length L of the protrusion made of the hexaboride single crystal that is not coated with the carbon film and the electric field distribution near the apex of the tip and a thermal electron emission amount generated from the protrusion is examined, and an optimum range of the thickness of the carbon film has been found.

FIG. 7 is a graph showing an electric field strength distribution near the apex of the tip when the length L of the protrusion is (a) 1 μm, (b) 5 μm, (c) 20 μm, and (d) 50 μm. As shown in FIG. 7, as in a case where the length L of the protrusion is (a) 1 μm, it can be seen that when almost all portions of the apex of the tip except for semicircular electron emission are covered with the carbon film, in addition to the apex of the tip, a strong electric field is also applied to the end face of the carbon film (a portion surrounded by a dotted line in (a) in FIG. 7). The electric field at the end face of the carbon film is rapidly reduced when the length L of the protrusion increases to 5 μm (b) and 20 μm (c), and when the length L is 50 μm (d), the electric field is reduced to substantially the same strength as the electric field normally applied to the side wall of the tip.

FIG. 8 is a graph showing a relation between the length L of the protrusion at the apex of the tip and the electric field strength F (V/m). The thickness of the carbon film is 1 μm. As can be seen from FIG. 8, when the length L of the protrusion is 1 μm, not only the electric field at the end face of the carbon film is strong, but also the electric field strength at the apex of the tip made of the hexaboride single crystal is lowered, and the electron source has a very unstable structure. In contrast, when the length L of the protrusion is 5 µm or more, the electric field strength at the apex of the tip is stabilized at about $1.5 \times 10^9$ V/m, the electric field strength F (V/m) at the end face of the carbon film is also reduced to about 1/10 of that at the apex of the tip, so that a stable electric field distribution can be formed, and the electron source can have a stable structure.

On the other hand, when the length L of the protrusion is too large, an exposure amount of the hexaboride single crystal having a low work function increases, and an effect of preventing the thermal electron emission, which is an original object, is reduced. FIGS. 9 and 10 show electric field strength dependencies of an emission current of a thermal electron emission component (TE), a Schottky emission component (SE), and a thermal field emission component (TFE) when tips having lengths L of protrusions of 5 µm, 20 µm, 50 µm, and 100 µm operate at 1350° C. When the length L of the protrusion is 5 µm, the thermal electron emission component (TE) is 3 µA to 9 µA, and the Schottky emission component (SE) can be mainly used if the electric field strength at the apex of the tip is increased to $1 \times 10^9$ V/m or more.

When the length L of the protrusion is 20 µm, the thermal electron emission component (TE) is 13 µA to 38 µA, and the Schottky emission component (SE) can be mainly used if the electric field strength at the apex of the tip is increased to $1.34 \times 10^9$ V/m or more. When the length L of the protrusion is 50 µm, the thermal electron emission component (TE) is 33 µA to 97 µA, and when the length L of the protrusion is 100 µm, the thermal electron emission component (TE) is 70 µA to 200 µA. Even when the electric field strength is $1.5 \times 10^9$ V/m, the current is larger than that of the SE component. Therefore, an optimum length L of the protrusion is 5 µm to 20 µm. However, as shown in FIG. 10, TE is about two orders of magnitude lower than SE in terms of the current density, and thus even when L is 50 µm to 100 µm, the SE component has a sufficiently large amount of the emission current from the apex of the tip, and can be used as the electron source with high luminance. However, the other ranges are not preferable because a current capacity of the high voltage power supply of the extraction electrode used in a normal electron microscope is large, the stability of the voltage is impaired, and a stabilizing circuit is expensive. It is not preferable because an amount of electron impact desorption gas increases, the emission current is unstable due to the decrease in degree of vacuum in an electron gun chamber, and a risk of discharge breakage increases. Therefore, L is preferably 5 µm to 100 µm, and more preferably 5 µm to 20 µm. A method for manufacturing an electron source having such a protrusion having L will be described later.

[Method for Manufacturing Electron Source]

Next, the method of manufacturing the electron source will be described. FIG. 11 is a schematic diagram showing the hexaboride single crystal. The hexaboride single crystal such as $CeB_6$ can form a large single crystal 3 by, for example, melt (liquid phase) crystal growth using a floating zone method or the like to have a diameter of several millimeter, and crystal growth in a [100] crystal axis direction perpendicular to a (100) plane of a habit plane on which a crystal preferentially grows, to have a length of several tens of millimeter. In the present embodiment, the single crystal 3 is cut into a tip 4 having a size of several hundreds of micrometer square and a length of several millimeter, and the (100) plane is used as an electron emission surface. In recent years, with progress of a crystal growth technique using the floating zone method, it is also possible to grow the crystal in a [310] crystal axis direction rather than the [100] crystal axis direction of the crystal habit axis, and use a (310) plane as the electron emission surface.

FIGS. 12 to 18 are schematic diagrams showing a joining step of a hexaboride tip. Subsequently, a joining method for holding the hexaboride tip and attaching a filament for heating will be described with reference to FIGS. 12 to 18. A metal tube made of tantalum or niobium and the hexaboride tip disposed inside the metal tube are provided with a plurality of recessed portions from at least two axial directions on an outer periphery of the metal tube to surround a central axis, and bottom portions of the plurality of recessed portions are brought into contact with an outer periphery of the hexaboride tip, whereby strong and reliable joining can be achieved in which the tip does not fall off even when heated for a long period of time.

Specific descriptions will be given below. First, a method for manufacturing the metal tube used for joining with the hexaboride tip will be described. FIG. 12 is a flowchart showing a step for manufacturing the metal tube. A material of the metal tube is a metal having a high melting point, such as tantalum and niobium, and is suitably a material that is rich in ductility, is easy to form a minute metal tube by tube elongation, and is easy to be processed with recessed portions to be described later. In the invention, tantalum is used as an example. First, a metal sheet 5 made of tantalum is rolled up, and two ends 6 of the metal sheet 5 are subjected to electron beam welding to form a semi-seamless tube 7 of tantalum having a large diameter. Subsequently, by repeatedly performing drawing and tube elongation using a die 8, a metal pipe 9 having an outer diameter of 500 µm, an inner diameter of 320 µm, and a thickness of 90 µm is prepared, and is further cut by a cutter 10 every 5 mm to prepare a minute metal tube 12.

In the invention, since the tips 4 of the electron source are inserted into the metal tube 12 and then joined as will be described later, an inner diameter of the metal tube 12 is preferably about 1.1 to 1.5 times of a maximum diameter of the tips 4. When the inner diameter of the metal tube 12 is 1.1 times or less the maximum diameter of the tips 4, a processing tolerance of the tips 4 is usually about 10%, and thus the number of tips 4 that cannot be inserted into the metal tube 12 increases, and a manufacturing yield of the electron source decreases. On the other hand, when the inner diameter of the metal tube 12 is 1.5 times or more of the maximum diameter of the tips 4, a dimensional difference between the inner diameters of the tips 4 and the inner diameter of the metal tube 12 is too large, a deformation amount of the metal tube 12 in a joining step of forming recessed portions to be described later is large. Therefore, an assembly accuracy is low or an assembly strength is low, power consumption increases and heat responsiveness decreases due to an increased heat capacity due to an increased volume of the metal tube 12.

Therefore, in a case of the tip 4 having a side of 200 µm (a quadrangular prism having a diagonal diameter of about 282 µm), the inner diameter of the metal tube 12 is preferably in a range of 310 µm to 423 µm. In the present embodiment, the inner diameter of the metal tube 12 is 320 µm. In the invention, a filament needs to be spot-welded to the metal tube 12 as will be described later, and the metal tube 12 needs to have a sufficient strength since the metal tube 12 needs to withstand high temperature heating for a long period of time during an operation. On the other hand, when the thickness is too large, the heat capacity of the metal tube 12 increases, which leads to low heating responsiveness of the electron source and an increase in heating power.

Since the CeB$_6$ Schottky emitter has an operation temperature of 900° C. to 1350° C. and the thermal field emitter has a relatively low operation temperature of 500° C. to 900° C., the thickness may be 50 µm or more. In the invention, the thickness is 90 µm.

Subsequently, a joining method for the hexaboride tip using the above metal tube 12 will be described. FIG. 13 is a schematic diagram showing a step of inserting the hexaboride into the metal tube. First, as shown in FIG. 13, the metal tube 12 is vertically erected by using a pedestal 14 in which a guide pin 13 which has a diameter of 300 µm and a length of 1 mm to 3 mm and which enters the inner diameter of the metal tube 12 is vertically erected. Next, the hexaboride tip 4 is inserted from above the metal tube 12. A length (protruding amount) A of the hexaboride tip 4 protruding from the inside of the metal tube 12 can be controlled by the guide pin 13. When the Schottky emitter or the thermal field emitter is prepared, the hexaboride tip 4 is shaved by electropolishing as will be described later, and thus the protruding amount should be as long as 2 mm to 3 mm.

Subsequently, as shown in FIG. 14, the hexaboride tip 4 and the metal tube 12 are press-welded together with a special tool from two orthogonal axes and four directions in a plane perpendicular to the vertical direction of the tip 4. FIG. 14 only shows a portion of a blade 15 as a press-weld tool in consideration of legibility of the drawing. At a tip of the blade 15 as the press-weld tool, two stages, i.e., protrusions 150 and 151 for forming the recessed portions in the metal tube 12 are provided, and are brought close to the metal tube 12 with an even stroke from two axes and four directions and crushed from an outer periphery of the metal tube 12 to form the recessed portions. During the operation, a positional relation between the metal tube 12 and the hexaboride tip 4 is confirmed by a stereomicroscope 16, and a rotation axis of the tip 4 is appropriately adjusted such that each side face of the hexaboride tip 4 having a quadrangular prism shape coincides with a stroke direction of the protrusions 150 and 151 of the tool. Accordingly, a plurality of recessed portions are formed to surround the central axis from the outer periphery of the metal tube 12, and a bottom portion of each of the recessed portions is in contact with an outer peripheral surface of the hexaboride tip 4, whereby the hexaboride tip 4 can be automatically fixed along the central axis of the metal tube 12. Since the blade is made to two stages, and the tip 4 and the metal tube 12 are joined at a position shifted in the axis direction, a joining force is increased, and since the tip 4 and the metal tube 12 are joined at two positions in the axis direction, the tip 4 can be prevented from being inclined at joined portions and an accuracy of axial alignment is improved. Although there is no restriction on the number of stages, it is desirable that the number of stages is about two since when there are too many stages, the length of the metal tube 12 needs to be increased to form the recessed portions and the heat capacity increases.

FIG. 15 is a schematic diagram of a joined body of the hexaboride tip 4 and the metal tube 12. (a) shows a cross-sectional view of the joined portion seen from a tip side of the tip 4, and (c) shows a cross-sectional view of a center of the tip 4 in the vertical direction. When the present joining method is used, the metal tube 12 and the hexaboride tip 4 can be equivalently press-welded with each other along the two axes and four directions, and mechanically strong joining can be obtained. In addition, since the protrusions are brought close to the metal tube 12 with an even stroke from the two axes and four directions and crushed from the outer periphery of the metal tube 12, the hexaboride tip 4 having a quadrangular prism shape can be automatically aligned and joined to the central axis of the metal tube 12, and the assembly accuracy is improved. Therefore, axial alignment of the electron source can be easily achieved and the yield is also improved. Since a portion which is shown by dotted lines and into which the guide pin 13 is inserted is no longer needed, the portion is cut off by the cutter in order to reduce the heat capacity of the metal tube 12.

Subsequently, as shown in FIG. 16, a filament 18 made of tungsten or the like is directly spot-welded to the metal tube 12 to which the hexaboride tip 4 is joined, and then two ends of the filament 18 are spot-welded to electrodes 20 fixed to a stem 19. Since these metals are joined to each other, strong joining can be easily obtained by spot-welding. During the spot-welding, a position alignment jig 21 as shown in FIG. 17 is used. First, when the filament 18 made of tungsten or the like is accurately positioned and spot-welded to the metal tube 12 by using a position alignment jig 21-1, and subsequently, the stem 19 and the metal tube 12 are accurately positioned and spot-welded by using a position alignment jig 21-2, the metal tube 12 and the hexaboride tip 4 are aligned with each other in the central axis, so that the axial alignment can be highly accurate.

In the above description, the tip 4 cut into a quadrangular prism shape is used. The tip 4 may be processed into a cylindrical shape. FIG. 18 shows an example in which the cylindrical tip 4 is used. When the hexaboride tip 4 and the metal tube 12 are joined to each other, the tip 4 and the metal tube 12 may be press-welded with a special tool developed in the invention from three axes and three directions at equal intervals in the plane perpendicular to at least the vertical direction of the tip 4. As in the case of the tip 4 having a quadrangular prism shape, it is of course possible to join the hexaboride tip 4 and the metal tube 12 from two axes and four directions.

Subsequently, a method for reducing a diameter of one side of the hexaboride tip into a tapered shape to form the shank and processing the tip of the shank into a hemispherical shape will be described. First, a process is developed in which the diameter of a columnar tip is reduced into a tapered shape by electropolishing to form the shank, and then only the tip portion of the tip is rounded into a hemispherical shape by electropolishing again or electric field evaporation.

As shown in FIG. 19, primary electropolishing is performed by dipping the tip of the assembled hexaboride tip 4 into an electrolyte solution 22 such as nitric acid, and applying a voltage from an AC or DC power supply 24 between a counter electrode 23 made of platinum or the like and formed in a ring shape. As shown in FIG. 20, when the hexaboride tip 4 is dipped in an electropolishing liquid, a meniscus is formed on a liquid surface, and a polishing speed at a liquid surface portion is slower than a polishing speed at a liquid portion. As the electropolishing progresses and a polishing area decreases, an electrolytic current decays, and when the electrolytic current decays to a certain level, the power supply is turned off, and a tip as indicated by dotted lines shown in FIG. 20 can be processed into a tapered cone. When the tip is a quadrangular prism, the tip can be processed into a quadrangular pyramid having a tapered tip, and when the tip is a cylinder, the tip can be processed into a cone having a tapered tip. FIG. 21 is a SEM observation photograph of the apex of the tip made of the hexaboride single crystal. FIG. 21 shows an SEM image of the hexaboride tip obtained by processing the tip having a quadrangular prism shape into the quadrangular pyramid having a tapered tip. Since the electropolishing basically proceeds isotropically, when a columnar tip has a quadrangular prism shape or a cylindrical shape, it is possible to process the columnar tip into an isotropic quadrangular pyramid or conical shape.

Subsequently, by dipping only the tip portion of the tip in the electropolishing liquid and polishing until the electrolytic current stops flowing, the tip can be rounded into a hemispherical shape. FIG. 22 is a SEM observation photograph of the tip of the hexaboride tip, and shows a SEM image of the hexaboride tip obtained by electropolishing the tip shown in FIG. 21 again and processing the tip into a hemispherical shape. The apex of the tip can be rounded to a hemispherical shape by electric field evaporation. The electric field evaporation is a method of ionizing and gradually peeling off atoms on a surface of the tip by applying a positive electric field of +several tens of V/nm to the electron source. The electric field evaporation occurs preferentially at a position where the electric field strength is strong. Therefore, atoms at a sharp position or a step portion of the surface can be evaporated, and atoms on the entire surface can be evaporated over time. Finally, when the electric field evaporation is sufficiently performed, the tip of the electron source has a hemispherical shape in which electric field strengths are uniform over the entire surface. FIG. 23 is a SEM observation photograph of the tip of the hexaboride tip, and shows a SEM image of the hexaboride tip having a hemispherical tip rounded by the electric field evaporation.

Next, a process of coating a side surface of the tip excluding the protrusion of the apex of the tip with the carbon film having a work function higher than that of the tip will be described with reference to FIG. 24. FIG. 24 is a schematic diagram showing a method of forming a coating film on the apex of the tip made of the hexaboride single crystal. An object of carbon coating is, as described above, to prevent unnecessary thermal electron emission from the side wall of the tip when the electron source is heated to operate as the thermal field emitter or the Schottky emitter. First, as shown in (a) of FIG. 24, a tip substrate (tip before carbon coating) is prepared, and a mask material 27 for preventing coating of the carbon film is applied to a tip of tip 25 and a part of a shank 26. As the mask material 27, it is possible to use, for example, a novolac resin used for a photoresist or the like, a resist material such as polyethylene glycol used as a water-soluble resist, an ionic liquid which is excellent in heat resistance, non-volatile, and has abundant variations in viscosity and solubility, and an electrowax excellent in peelability. Specifically, the tip of tip 25 is dipped in the mask material 27 such as a resist liquid, an ionic liquid, or a melt of electrowax dissolved by heating, and then the tip is pulled up to apply the mask material 27. Although not shown, the mask material 27 may be discharged from a microdispenser and applied to the apex of the tip.

Subsequently, as shown in (b) of FIG. 16, a carbon film 29 is formed using a carbon target 28 and a sputtering device capable of forming a film at room temperature. By forming the film at room temperature, the film functions as the mask material 27 without thermal condensation of a resist material or re-melting of electrowax, and it is possible to prevent the carbon film 29 from being coated on a protrusion 30 including the tip of tip 25.

Finally, as shown in (c) of FIG. 16, the mask material 27 such as a resist material, an ionic liquid, or electrowax is peeled from the tip. The resist material can be dissolved and peeled by being dipped in a peeling liquid (a dedicated alkaline stripping liquid, an organic solvent, water, and the like). The electrowax is generally a material with good peelability and can be easily mechanically peeled off the tip. During the peeling, since the carbon film 29 on the mask material 27 is also peeled off at the same time, it is possible to manufacture an electron source in which the hexaboride tip is exposed only in the protrusion 30 including the tip of tip 25, and the carbon film 29 is coated on the other side wall of the tip. An example of a SEM photograph of the manufactured electron source is shown in FIG. 17.

Subsequently, this electron source is introduced into a vacuum device to activate the electron source. An oxide or the like is formed on a surface of the electropolished hexaboride tip, electrons cannot be emitted as it is. Therefore, surface activation is performed to clean the electron emission surface by performing thermal annealing at about 1150° C. to 1500° C. for several minutes to several tens of hours. Accordingly, a clean (100) crystal plane or (310) crystal plane can be formed at the apex of the tip. As described above, the electron source of the invention can be completed. FIG. 25 is a SEM observation photograph of the hexaboride single crystal tip. The length L of the protrusion 30 of the hexaboride single crystal protruding from the carbon film 29 is 15 μm.

In a tip with a large size in the related art (a curvature radius R of the tip: about 20 μm to 120 μm), a coating film is formed even at the tip portion of the tip, and then the coating film at the tip portion is physically peeled off by machining, but a tip having a minute tip portion (a curvature radius R of the tip: 1.2 μm or less) as in the invention cannot be processed in this way. As described above, the invention can form the coating film on the tip portion excluding the electron emission portion of the tip by masking the minute tip portion.

As described above, the invention can provide an electron source, an electron beam device, and a method for manufacturing an electron source that prevent an occurrence of side emission in the field emitter or the Schottky emitter using the hexaboride single crystal.

The embodiment described above is described in detail for easy understanding of the invention, and is not necessarily limited to those including all the configurations described above. A part of a configuration of one embodiment may be replaced with a configuration of another embodiment, and a configuration of one embodiment may also be added with a configuration of another embodiment. A part of a configuration of each embodiment may be added to, deleted from, or replaced with another configuration.

REFERENCE SIGN LIST 1 metal atom
2 boron atom
3 single crystal
4 tip
5 metal sheet
6 two ends of metal sheet
7 semi-seamless tube
8 die
9 metal pipe
10 cutter
12 metal tube
13 guide pin
14 pedestal
15 blade
16 stereomicroscope
17 recessed portion
18 filament 19 stem
20 electrode
21 position alignment jig
22 electrolyte solution
23 counter electrode
24 power supply
25 apex of tip
26 shank
27 mask material
28 carbon target
29 carbon film
30, 40 protrusion
41 shank
42 body
43 tip
100 CeB$_6$ Schottky emitter
101 computer
102 controller
103 heating power supply
104 extraction power supply
105 extraction electrode
106 electron beam
107 acceleration power supply
108 anode
109 first condenser lens
110 aperture
111 second condenser lens
112 objective lens
113 astigmatism correction coil
114 deflection scanning coil
115 sample
116 secondary electron detector
120 electron source
130 electron optical system
200 electron beam device

The invention claimed is:

1. An electron source comprising:
a protrusion configured to emit an electron when an electric field is generated;
a shank that supports the protrusion and having a diameter decreasing toward the protrusion; and
a body that supports the shank, wherein
the protrusion, the shank, and the body are each made of a hexaboride single crystal,
a part including the shank and the body excluding the protrusion is covered with a material having a work function higher than that of the hexaboride single crystal,
the protrusion includes a tip having a curvature radius of 0.2 μm or more and 0.5 μm or less,
a length of the protrusion is 5 μm or more and 20 μm or less, and
a thickness of a covering film of the material covering the part including the shank and the body excluding the protrusion is 1 μm.

2. The electron source according to claim 1, wherein the material having a work function larger than that of the hexaboride single crystal is carbon.

3. The electron source according to claim 1, wherein the protrusion emits the electron by Schottky emission, and
an electric field of 1×10$^9$ V/m or more is applied to the tip of the protrusion which is heated to 950° C. to 1350° C.

4. The electron source according to claim 1, wherein the protrusion emits the electron by thermal field emission, and
an electric field of 1.5×10$^9$ V/m or more is applied to the tip of the protrusion which is heated to 500° C. to 900° C.

5. An electron beam device comprising:
an electron source;
a sample stage on which a sample is to be placed;
an electron gun optical provided with an acceleration electrode and an extraction electrode that extracts an electron from the electron source; and
an electron optical system configured to focus the emitted electron on the sample on the sample stage and irradiate the sample with the emitted electron, wherein
the electron source is the electron source according to claim 1.

6. A method for manufacturing an electron source, the electron source including a tip substrate that includes a protrusion configured to emit an electron when an electric field is generated, a shank that supports the protrusion and has a diameter decreasing toward the protrusion, and a body that supports the shank, wherein the protrusion, the shank, and the body are each made of a hexaboride single crystal, the method comprising:
a step of forming a mask on the protrusion of the tip substrate;
a step of forming, on a part of the tip substrate including the shank and the body but excluding the protrusion, a material having a work function larger than that of the hexaboride single crystal; and
a step of removing the mask to expose the protrusion;
wherein the protrusion includes a tip having a curvature radius of 0.2 μm or more and 0.5 μm or less,
a length of the protrusion is 5 μm or more and 20 μm or less,
and a thickness of a covering film of the material formed on the part including the shank and the body but excluding the protrusion is 1 μm.

7. The method for manufacturing an electron source according to claim 6, wherein
the mask is formed of a resist, an ionic liquid, or wax.

8. The method for manufacturing an electron source according to claim 6, wherein
the mask is dissolved by a peeling liquid and peeled off, or is mechanically peeled off.

* * * * *